United States Patent [19]

Becking

[11] Patent Number: 4,629,530

[45] Date of Patent: Dec. 16, 1986

[54] APPARATUS FOR WELDING OF CONTINUOUS LOOP RIBBON

[76] Inventor: Paul E. Becking, 13795 Vista Dorada, Salinas, Calif. 93908

[21] Appl. No.: 646,038

[22] Filed: Aug. 30, 1984

Related U.S. Application Data

[63] Continuation of Ser. No. 475,235, Mar. 14, 1983, abandoned.

[51] Int. Cl.$^4$ .......................................... B65H 69/02
[52] U.S. Cl. ..................... 156/502; 156/734; 156/157; 156/250; 156/526; 156/580.1; 264/152; 269/24; 269/42; 269/87.1; 269/91; 269/109; 269/242; 403/270; 901/39
[58] Field of Search .................... 269/37, 41–42, 269/152, 40, 87.1, 87.2, 89, 91–92, 109, 161, 153, 265, 24, 242; 403/270; 156/73.5, 73.4, 157, 159, 251, 270, 353, 380.4, 582, 510, 515, 526, 535, 580.1, 580.2, 580, 250, 73.3; 264/138, 145, 152, 163; 914/729–730, 744 A; 901/39; 83/373, 382, 385, 605, 633, 639

[56] References Cited

U.S. PATENT DOCUMENTS

| | | | |
|---|---|---|---|
| 1,342,891 | 6/1920 | Bergstrom | 269/109 |
| 2,188,433 | 1/1940 | Friese | 269/242 |
| 3,354,769 | 11/1967 | Abramson et al. | 269/87.2 |
| 3,362,301 | 1/1968 | Kohlitz | 269/24 |
| 3,375,727 | 4/1968 | Techtmann et al. | 156/583.8 |
| 3,447,994 | 6/1969 | Abramson et al. | 156/502 |
| 3,533,616 | 10/1970 | Bettenhausen | 83/385 |
| 3,821,048 | 6/1974 | Acker | 156/157 |
| 3,951,271 | 4/1976 | Mette | 414/730 |
| 4,105,489 | 8/1978 | Lotto | 156/510 |
| 4,280,279 | 7/1981 | Grundfest | 269/41 |
| 4,313,781 | 2/1982 | Rouigo | 156/510 |
| 4,344,729 | 8/1982 | Orsinger | 414/730 |
| 4,368,096 | 1/1983 | Kobayashi | 156/502 |
| 4,482,421 | 11/1984 | Gurak | 156/580.1 |

FOREIGN PATENT DOCUMENTS 2247748  9/1972  Fed. Rep. of Germany .

OTHER PUBLICATIONS

Branson "Ultrasonic News" 4/1974, pp. 8–11.
Branson "Ribbon Splicing Fixture" 8/79, Data Sheet FF-6.

*Primary Examiner*—Michael W. Ball
*Assistant Examiner*—Merrell C. Cashion, Jr.
*Attorney, Agent, or Firm*—David S. Wise

[57] ABSTRACT

There is provided a method and apparatus for adjoining the two ends of a length of impact printer ribbon to form a continuous loop of ribbon within a ribbon cartridge. A welding fixture includes a plate, alignment guide bars defining crisscrossed alignment paths for the ribbon ends, clamps for securing the ribbon ends within the alignment paths, and a cutter mechanism for precisely cutting the ribbon. The fixture further includes mechanical means for manipulating the ribbon during the welding process. The apparatus and method of the present invention enables the ribbon welding process to be streamlined and the precision to be greatly improved.

9 Claims, 20 Drawing Figures

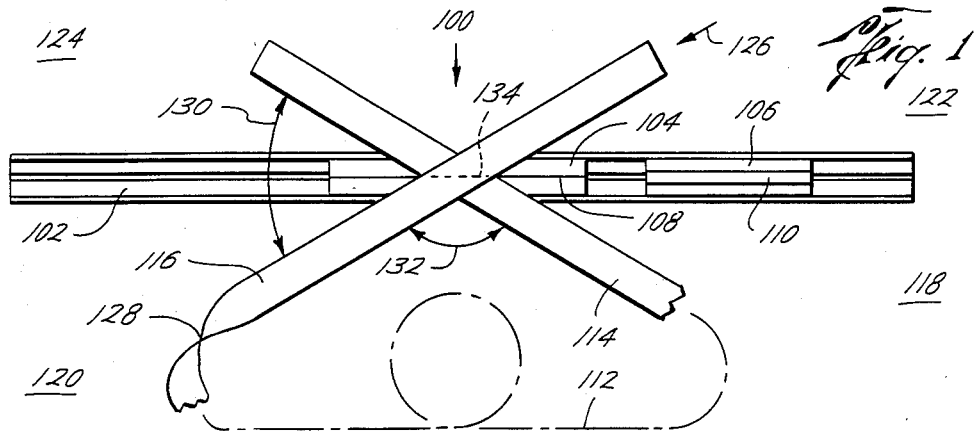
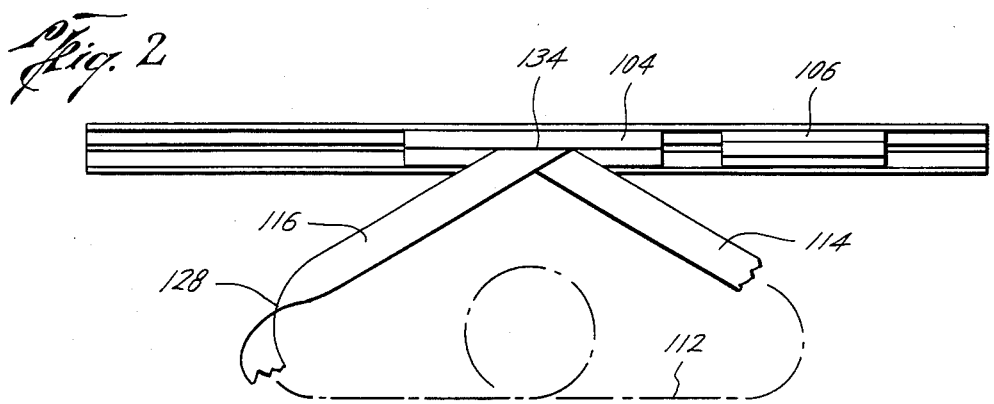
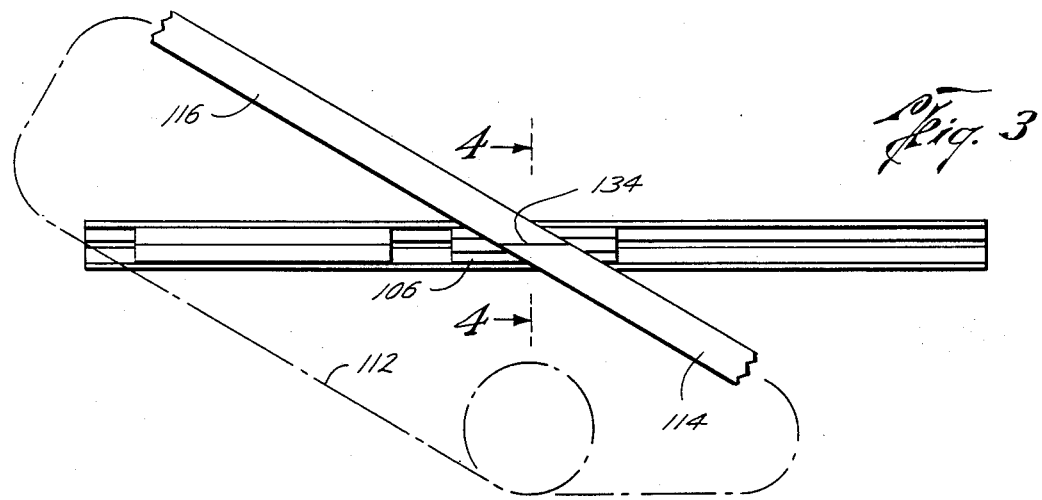
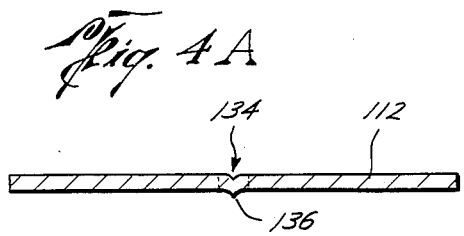
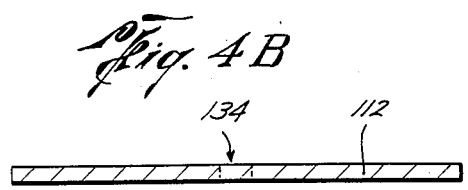

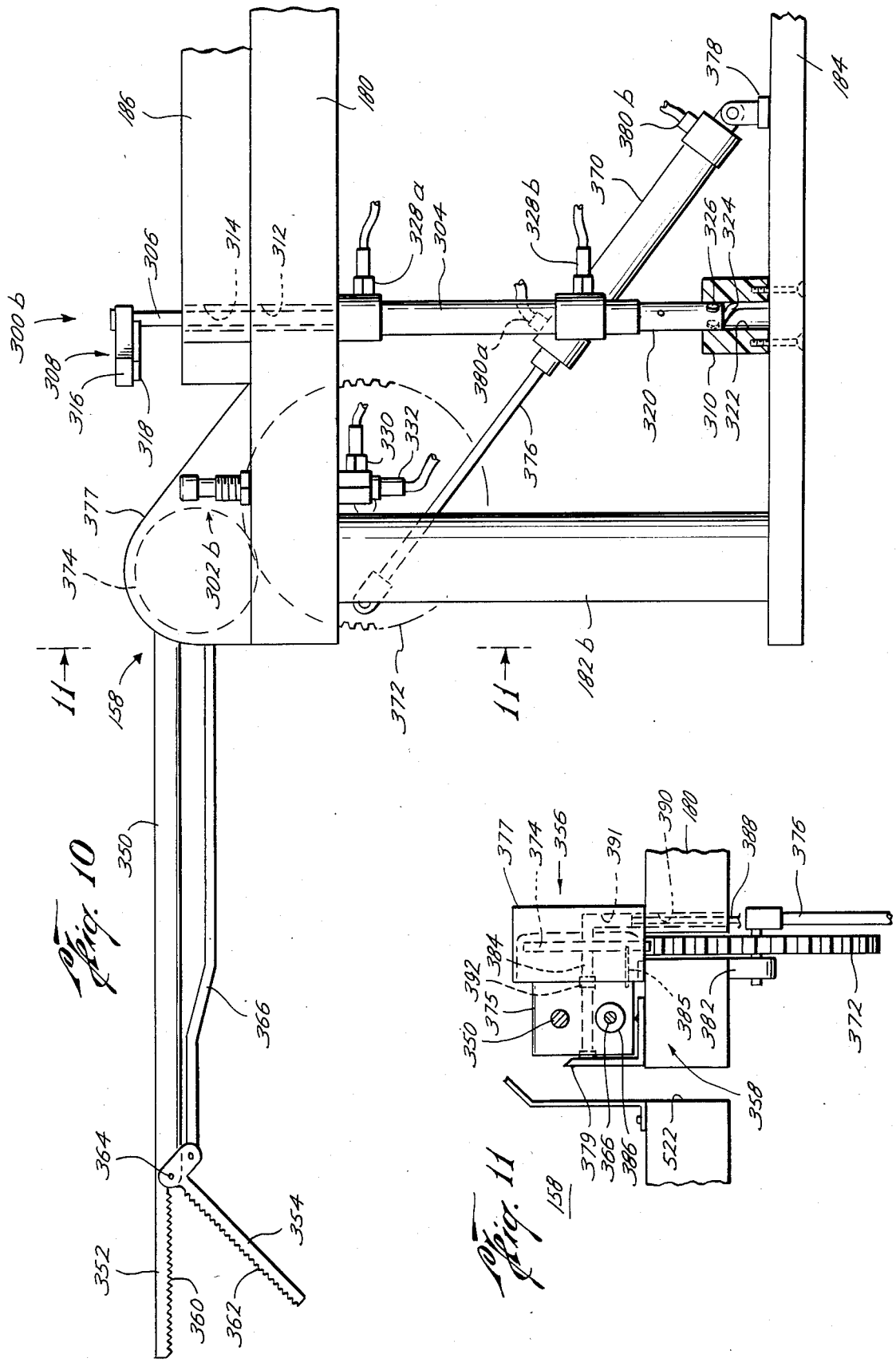

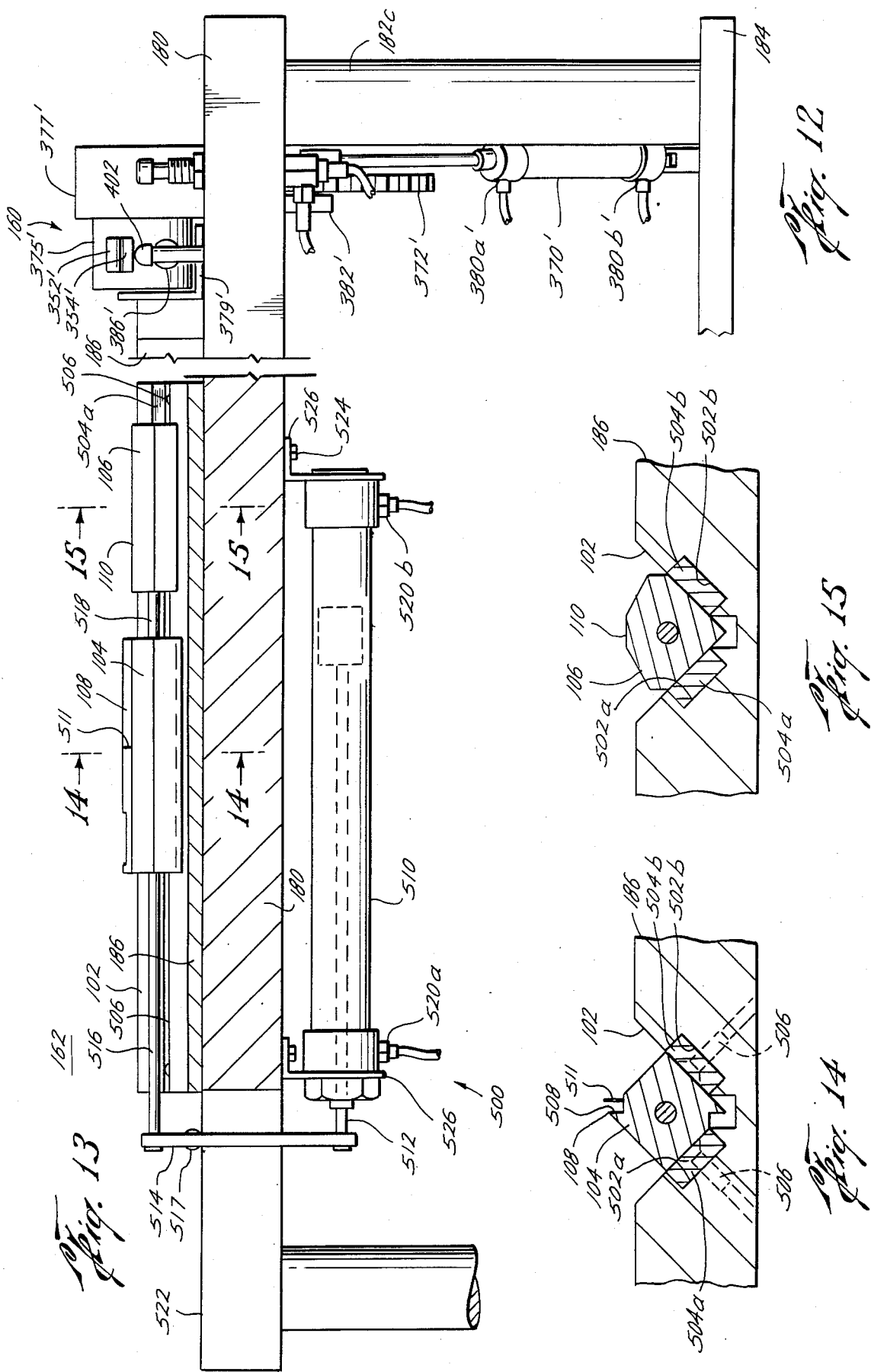

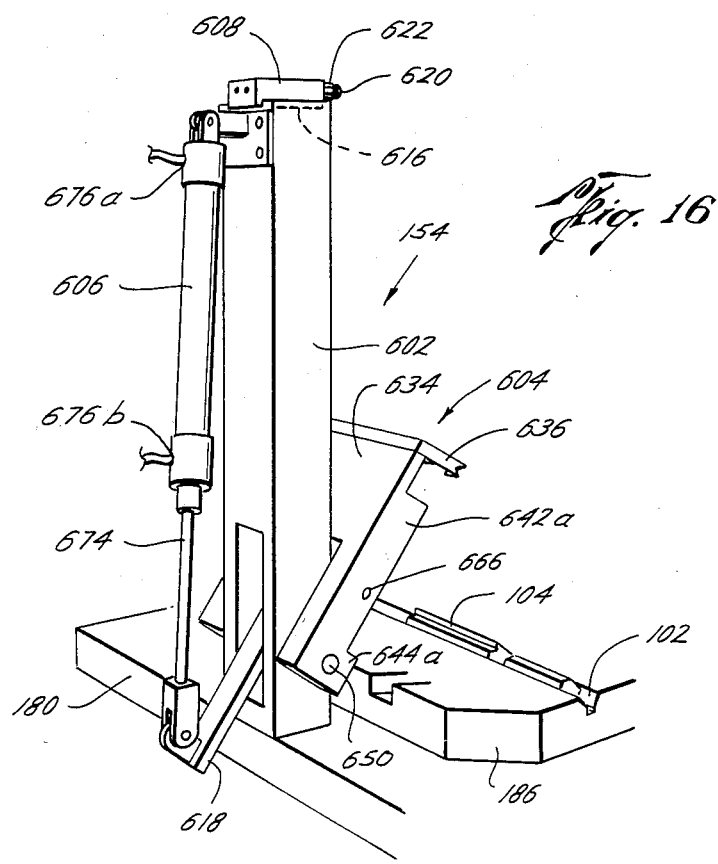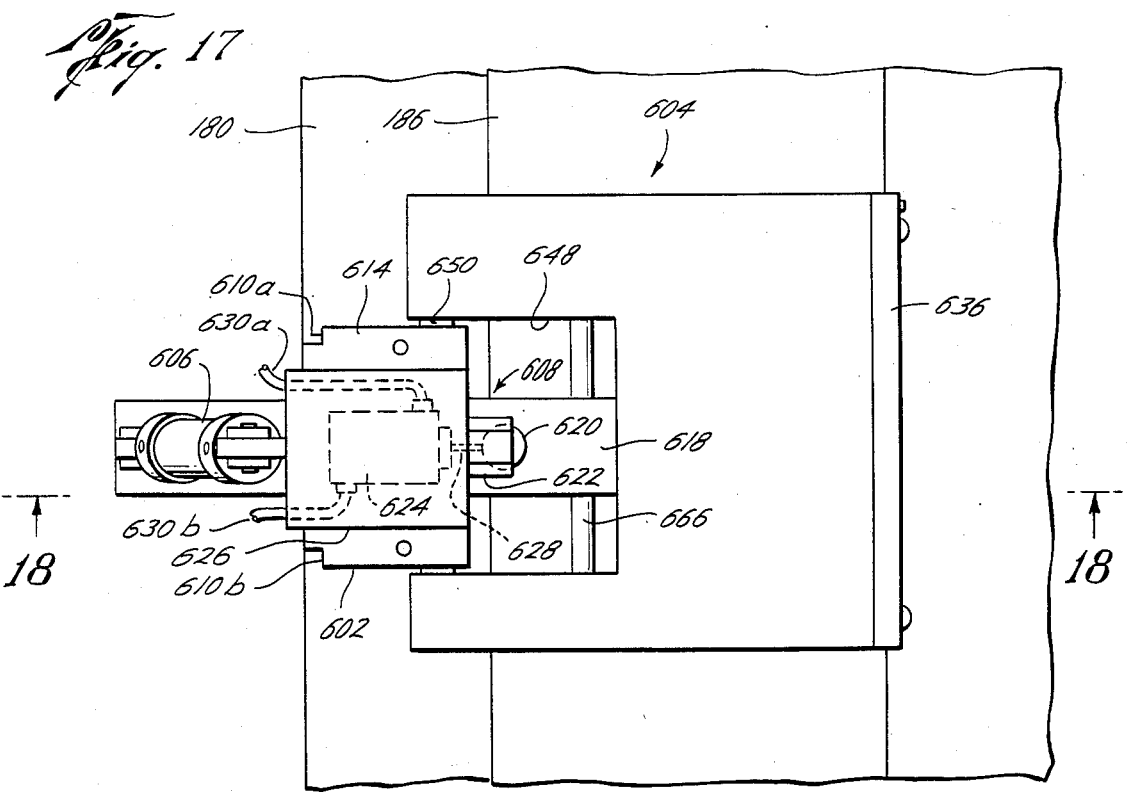

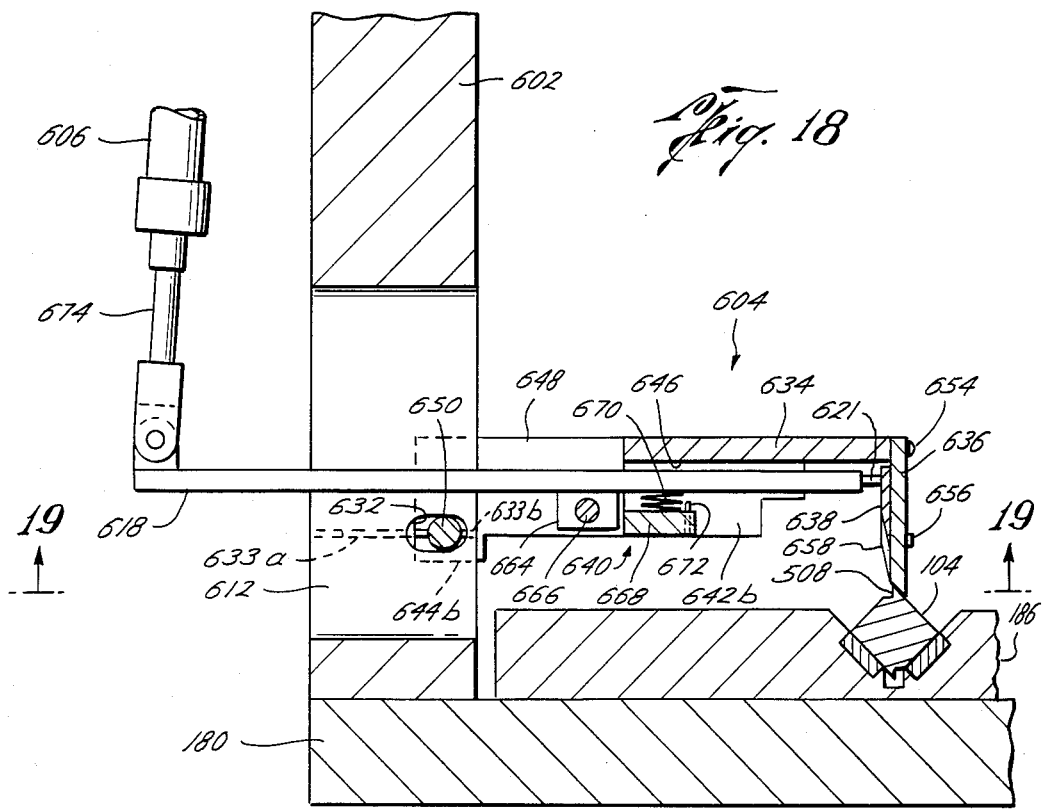
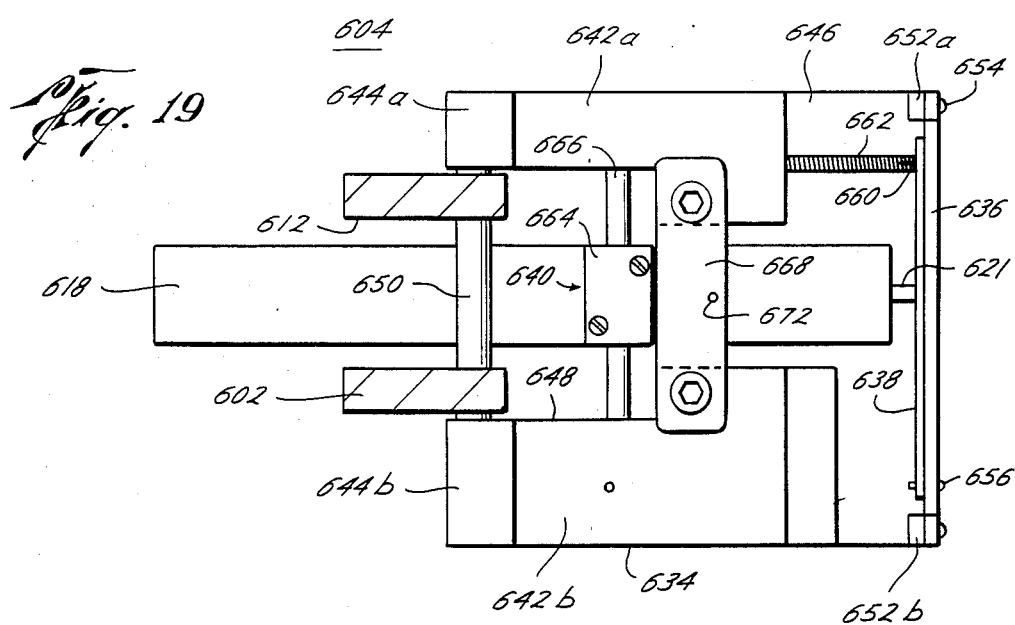

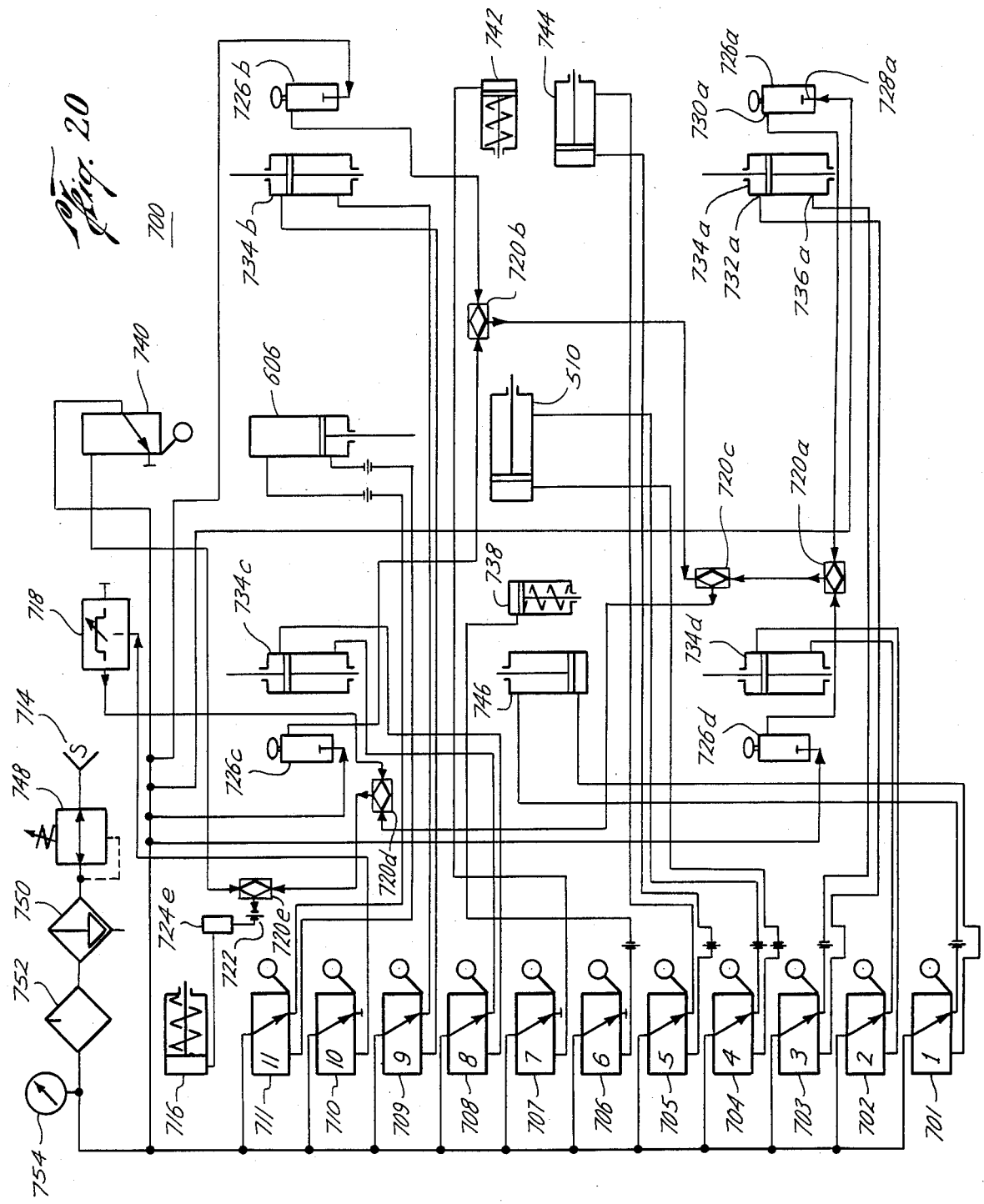

APPARATUS FOR WELDING OF CONTINUOUS LOOP RIBBON

This is a continuation of co-pending application Ser. No. 475,235 filed Mar. 14, 1983, now abandoned.

BACKGROUND OF THE INVENTION

This invention relates generally to the art of manufacturing ribbons for use with printers associated with equipment such as computers and word processors. More particularly, the present invention provides a method and apparatus for efficiently and accurately adjoining the ends of a length of a ribbon so as to form a continuous loop supported within a ribbon cartridge.

Present society is highly dependent upon the use of microprocessors, minicomputers, and mainframe computers. In addition to the more traditional use of computers as a research tool, computers are now often found in the home environment and work environment of individuals who, until recently, never before came into contact with a computer. Computers are used to automate equipment in a manufacturing facility, to automate secretarial duties at the office (word processors), and to automate a myriad of toys and tools around the home.

All computers, whether mainframe computers, minicomputers, or microcomputers, share a common requirement for some means of communication with users. Such means of communication may vary from the simple light-emitting diode (LED) to the complex cathode ray tube (CRT) terminal. A common means for communication of information from a computer to a user is a printer. Printers typically receive from the computer a stream of information in the form of digital electronic signals and convert the electronic signals to a series of symbols (letters and words) printed on paper.

A first common type of printer is an impact printer, so named for the means by which characters are printed on the paper. Each symbol which the impact printer is capable of generating is permanently embossed on a striking surface (analogous to the ball within a typewriter) within the printer. The printing of a particular character is accomplished by aligning the embossed image of that character on the striker with the paper surface onto which the character is to be printed, positioning a printer ribbon having ink thereon between the striker and the paper, and causing the striker to impact the ribbon against the paper surface so as to result in an ink image of the embossed character on the surface of the paper. Printer ribbons are typically made of fabric, such as nylon, or a polyester film coated with a carbon-type surface.

A second common type of printer is a dot matrix printer. Such a printer includes a group of small-diameter wires oriented parallel to one another and arranged in a two dimensional matrix. Each wire is arranged for independent extension from its normal matrix position to contact a printer ribbon, thereby printing a dot image on an adjacent paper surface. By selectively extending particular patterns of wires, dot images can be combined to form alphanumeric or other legible characters on the paper surface.

In approximately 1970 there first appeared on the market a printer ribbon having the ends thereof adjoined to form a continuous loop. The continuous loop ribbons are supported within cartridges which easily may be removed from and inserted within the printers. Such continuous loop cartridges mechanically simplify the ribbon control portion of printers and thereby eliminate a potential source of printer failure.

The first continuous loop ribbons were adjoined by a simple end-to-end overlap-weld process. To accomplish this process the two ribbon ends are placed in an overlapping configuration with one end overlapping the other by approximately 0.025 inch. The two ends are then welded together by means of ultrasonic vibration, which heats the overlapping fabric material to its melting point and thereby adjoins the two ends. Alternatively, a small diameter, resistance-heated wire may be oriented adjacent to the overlapping ends and properly spaced a short distance therefrom to weld the two ends together.

The end-to-end overlap weld presented several problems. First, the density of the ribbon in the region of the overlap is increased by compression of the overlapped ribbon ends during the welding process. The increased density within the overlap region hardens the ribbon and thereby diminishes the quality of the printed image on paper. The printed image appears blurred or smudged and, consequently, often illegible.

The second problem with the end-to-end overlap weld is its susceptibility to tearing due to the weakened state of ribbon fibers in the overlap region. A ribbon cartridge typically includes a pair of drive gears and a tensioner mechanism. The loop of ribbon passes between the drive gears, which are used to import motion to the ribbon, while the tensioner mechanism maintains the ribbon taut within the ribbon cartridge. Because the ribbon fibers in the region of the overlap were substantially weakened or destroyed by excessive heat during the welding process, the overlap region of the ribbon is especially susceptible to the increased pressure experienced by the ribbon as it passes between the drive gears. After a period of time, the increased pressure causes the ribbon to begin to tear in the overlap region. The combination of drive gears and the tensioner mechanism eventually results in a separation of the ribbon loop in the region of the overlap.

The process of heating the overlap region by means of a hot wire includes the further problem of controlling the position of the hot wire relative to the ends of the ribbon to be welded. A hot wire positioned too close to the ribbon is likely to sever the ribbon rather than weld it.

In an effort to alleviate the problems associated with the end-to-end overlap weld, the angular overlap weld process was developed. The process for forming an angular overlap weld begins by trimming the two ends of the ribbon along a diagonal line to form opposing forty-five degree angles. The two trimmed ends are then overlapped by approximately 0.025 inch and welded according to one of the methods described above for the end-to-end overlap weld. The angular overlap process thereby results in a weld oriented at forty-five degrees relative to the direction of movement of the ribbon, rather than normal thereto as in the case of the end-to-end overlap weld. The angularly oriented weld tended to improve the quality of the printed characters and also improved slightly the durability of the weld. Nonetheless, the problems described above persisted.

The next major improvement in continous loop weld technology was the development of the angular butt weld process. The angular butt weld process requires use of a base, known as the welding anvil, positioned beneath the two ends of the ribbon. The welding anvil includes upwardly sloping sides converging on a flat upper surface of land having a width of 0.005 to 0.020 inch and a length of an inch or more. For the purpose of illustrating the angular butt weld process, assume that the welding anvil is positioned in front of an operator with its lengthwise dimension extending from side-to-side. The operator grasps the right end of the ribbon and positions it across the welding anvil at forty-five degrees with respect to the lengthwise dimension of the anvil. The operator then grasps the left end of the ribbon, twists it to form a 180-degree counterclockwise spiral therein (as viewed by looking toward the end), and positions the left end in crisscross fashion across the top of the right end of the ribbon and the anvil. The two ends of the ribbon are now oriented at ninety degrees with respect to one another and at forty-five degrees with respect to the lengthwise dimension of the anvil. The land surface of the anvil now extends from corner to corner of the intersection of the crisscrossed ribbon ends.

Next, the active mechanism, or horn, of an ultrasonic welder is lowered on top of the crossed ribbons to press the ribbons firmly against the land surface of the anvil. Ultrasonic vibration generated by the welder heats the fabric ribbon and forms a weld bead, which conforms substantially to the dimensions of the land surface of the anvil against which the ribbons are pressed. The force of the welder horn against the anvil is also used to cut the ribbon along the weld bead. The two ribbon ends which were severed by this process are discarded. The operator then grasps the left side of the ribbon and rotates its clockwise 180 degrees to return it to its original orientation. The result is a continuous length of ribbon adjoined by a welded bead oriented at 45 degrees with respect to the direction of travel of the ribbon.

Subsequent to the reorientation of the ribbon, the welding anvil is replaced by an ironing anvil, which has a flat upper surface of land substantially greater in width than the land surface of the welding anvil. The welder is then lowered once again and the weld bead reheated and pressed between the welder horn and the ironing anvil to cause the ribbon in the region of the weld bead to assume a thickness substantially the same as that of the ribbon elsewhere.

The angular butt weld constituted a dramatic improvement over the overlap welds. Because the thickness of the ribbon in the region of the weld was reduced, the quality of the printed character generated by striking the weld region was much enhanced. In addition, the reduction in thickness diminished the tendency of the weld region to tear and thereby increased the average life of a continuous loop ribbon cartridge. Shortly after introduction of the forty-five degree angular butt weld, it was discovered that a sixty-degree butt weld constituted a further improvement in both the strength and the life of the weld. The improvements resulting from the angular butt weld were, however, accompanied by several new problems.

A first problem is controlling the width of the weld bead. As noted above, the land surface of the welding anvil may be from 0.005 inch to 0.020 inch in width. Prior to cutting the ribbon along the weld bead, the weld bead is typically 0.002 inch wider than the land surface of the welding anvil. The opposing forces of the welder horn and the welding anvil may generate a cut in the weld bead in any position along the width of the land surface. Thus, the weld bead adjoining the ends of the ribbon may be as little at 0.002 inch wide or as great as 0.022 inch wide, depending on the path of the cut along the length of the weld bead. The width of the final weld bead is important because the strength of the weld changes proportionately with the width of the bead. For example, a 0.002 inch bead may result in a one to two pound break test, whereas a 0.010 inch bead may produce a break at four to fifteen pounds, the exact break point being dependent upon the width of the ribbon.

In an effort to control the path of the cut along the weld bead, the land surface of the welding anvil has been inclined to form a cutting edge along one side approximately 0.001 inch higher than the lower edge. This configuration results in a consistent weld bead cut pattern until such time as the contacting surface on the welder horn wears in conformance to the cutting edge, whereupon the inconsistent cutting pattern resumes. Such conforming wear on the welder horn typically occurs within one week of single shift production using the welder, thereby necessitating frequent precision machining of the welder horn. Because a typical welder horn can be resurfaced only approximately six times, and because welder horns range in price from $300.00 to $800.00 each, it is not uncommon for a manufacturer to spend as much as $4,000.00 per year per welding operation on new welder horns alone.

The inclined land surface configuration creates additional problems with the width of the weld bead, which recedes in width from the edge of the land surface receiving the least amount of cutting-welding pressure. The break test strength of such a weld varies almost as much as that of a weld formed on the flat land surface. Even in the absence of an inclined land surface, use of the welder horn to cut the ribbon along the weld bead results in significant and rapid deterioration of the horn, with its attendant costs.

The process of continuous loop fabric ribbon welding, as described above, requires the use of two distinct pieces of equipment. The first is a welding apparatus, preferably an ultrasonic welder, such as is manufactured by Branson Welding Company. The process also requires a welding fixture which provides, at a minimum, means for holding the ribbon in the desired crisscross pattern during the welding operation, a welding anvil, and an ironing anvil.

The welding fixture is positioned on a welder table, above which is suspended the welder horn. The welder horn is supported on a welder carriage by a carriage arm which extends upward from the rear of the welder table. On actuation of the welder, the welder horn travels downward along the carriage arm until it is stopped by an adjustable micrometer downstop.

In approximately March of 1979, Branson Welding Company began to manufacture a welding fixture for use in cooperation with its ultrasonic welders. The fixture includes a pair of crossing tracks with spring clips at the ends thereof to provide the proper orientation and gripping of the fabric ribbon ends. The crossing tracks are wide enough to handle large-width ribbons, such as one inch ribbons and, hence, do not conform precisely to the width of smaller ribbons, thereby introducing the possibility of error in their alignment. In addition to the welder horn, the welder carriage on the Branson machine supports four spring-loaded legs extending outwardly and downwardly from the welder carriage in alignment with the ends of the tracks on the welding fixture. As the welding carriage is lowered onto the welding fixture, pads at the base of each of the four legs contact the ribbon for the purpose of holding it in place while the horn welds and cuts the ribbon. Thereafter, the operator discards the waste ends of the ribbon, rotates the left end of the ribbon to return it to proper alignment, replaces the welding anvil with the ironing anvil, and initiates the second phase of the welding process, called the ironing stroke, to flatten the weld bead. In addition to flattening the weld bead, the ironing stroke widens the bead by as much as 50 to 100 percent.

Because of the previously discussed problems inherent in the angular butt weld process and because of the lack of precision in alignment and clamping of the ribbon ends, the Branson welding fixture provides an undesirably high rejection rate of finished continuous loop ribbons. As a result, most manufacturers have, either directly or indirectly, undertaken the design and manufacture of their own welding fixture. Typically, these fixtures include a pair of crossing tracks machined into a steel plate. The plate may, for example, be hardened steel which is heat treated and ground to the desired configuration. The width of the machined tracks are typically one inch, representing the widest ribbon normally handled by the fixtures, and are adjustable to the width of smaller ribbon by means of small metal blocks or magnets of various sizes.

The ribbon is typically positioned within the crossing tracks of the custom fixtures by grasping a first length of ribbon from one end of the cartridge, stretching the first length of ribbon across the length of a first track, releasing one end of the first length of ribbon while the other end is being clamped under a first magnet, tensioning the first length of ribbon, and clamping the loose end of the first length of ribbon between a second magnet and the welding fixture. A second length of ribbon from the opposite side of the cartridge is clamped in crossing relationship with respect to the first length of ribbon in a similar manner, after the operator twists the ribbon end 180 degrees. The welder is then actuated to weld and cut the ribbon. Next, the operator removes the magnets from the rear side of the fixture to free the waste ends of the ribbon, removes the front magnet from the second length of ribbon, rotates the second length of ribbon to remove the twist and return it to its proper alignment, reclamps the left length into position at the rear side of the fixture, and actuates the welder to perform the ironing operation.

Even with the additional apparatus for aligning the ribbon within the crossing tracks, the ribbons may be as much as 0.125 inch off the centerline of the track, causing a misalignment or bend in the ribbon at the point of the bead. With as little as 0.031 inch misalignment, the ribbon is likely to hang within the ribbon cartridge.

With a combination of the problem associated with the Branson welding fixture, the custom-designed fixtures, and welder horn cutting, and the problems described above for angular butt welds, i.e., variable weld strength and rapid deterioration of welding equipment, it is hardly surprising that most continuous loop manufacturing operations have a high rejection rate for completed printer ribbon cartridges as well as a needlessly high overhead equipment expense. Hence, it should be apparent that certain inadequacies exist in the present method and apparatus for adjoining the two ends of a fabric ribbon.

SUMMARY OF THE INVENTION

Accordingly, there is provided herein a method and apparatus for adjoining the ends of a ribbon to form a continuous loop of ribbon within a printer ribbon cartridge. The apparatus of the present invention comprises a welding fixture which facilitates a precision welding process whereby the two ends of the ribbon are adjoined. The welding fixture includes a plate for supporting portions of the fixture, guide means for use in precisely positioning the ribbon ends in a crisscross arrangement, clamping means which automatically clamps the ribbon to the plate, and a cutting means which precisely cuts the welded ribbon in an operation separate and distinct from the welding operation.

The guide means includes four pairs of guide bars positioned on the fixture so as to define crisscrossed alignment paths. The width of the spacing between the bars of any one pair is quickly and easily adjusted by a left and right lead screw mechanism supporting the bars. The guide means thereby provides a precision ribbon alignment guide and is easily adjusted for various widths of ribbons.

The clamping means includes a ribbon clamp and a ribbon clamp switch near each pair of guide bars. The ribbon clamp switches are positioned along the centerlines of the alignment paths, so that when one length of ribbon is held by the operator in two hands along one alignment path, the two pertinent ribbon clamp switches are directly beneath the operator's right and left hands. The clamp switches can therefore easily be depressed while the ribbon end is held tautly along the alignment path.

When the clamp switches are depressed, the control system of the welding fixture causes a ribbon clamp to rotate into position above the ribbon and then drop directly onto the ribbon, clamping it against the plate below. The clamping means thus provides an effective apparatus for securing the ribbon ends into the alignment means.

After the ribbon ends have been clamped at four corners into the alignment means, the operator actuates a welder apparatus which performs a welding operation. During the welding operation, a welder horn is lowered into contact with the crisscrossed ribbon ends. A welding anvil, having an upper land surface with a width of approximately 0.005 to 0.020 inch and a length of an inch or more, supports the ribbon ends at their crossing point from the lower side thereof. The welder horn presses the ribbon ends against the welding anvil and ultrasonically vibrates the ribbon material, thereby heating it and fusing it along a line conforming substantially to the dimensions of the land surface of the welding anvil. The ribbon ends are not severed by the welder horn. Hence, the welder horn never contacts the welding anvil. The welding fixture includes a separate cutter mechanism for performing a precision cutting operation.

The cutter mechanism includes a lower cutting blade supported on the plate below the ribbon, a cutter housing pivotally supported above the ribbon, an upper cutting blade attached to the cutter housing, and means for pivoting the upper cutting blade into position adjacent to the lower cutting blade. After the welding operation, the pivoting means causes the cutter housing to move from an upper position to a lower position adjacent to the welded ribbon and causes the upper and lower cutting blades to sever the ribbon precisely along a predetermined path within the weld bead. The cutter mechanism thereby improves the strength of welds by precisely controlling the position of the cut along the weld bead. The cutter mechanism also diminishes wear on the welder apparatus, and its attendant expense, by separating the cutting operation from the welding operation.

The welding fixture also includes a pair of arm assemblies for manipulating the ribbon ends. Each assembly includes an arm which is pivotally supported on the fixture, a thumb at the end of each arm, and a finger which pivotally closes against the thumb for grasping therebetween a ribbon end. A first arm assembly, known herein as the right arm assembly, is arranged for disposing of the ribbon ends severed during the cutting operation. A second arm assembly, or left arm assembly, is arranged to rotate a ribbon end 180 degrees to remove therefrom a twist and straighten the welded ribbon into a straight line. Both arm assemblies operate automatically in response to a control system.

After the cutting operation and after the left arm assembly has straightened the ribbon, an iron operation is performed. During the ironing operation, the welding anvil is replaced with an ironing anvil, which has an upper land surface with a width substantially greater than that of the land surface of the welding anvil. With the ironing anvil positioned beneath the welded ribbon, the welding apparatus is lowered into contact with the ribbon for a second time and the ribbon is again ultrasonically heated. The weld bead formed during the welding operation is flattened and widened during the ironing operation.

The welding fixture is controlled, in substantial part, by a pneumatic control system. The control system includes a source of pressurized fluid, a plurality of cam-actuated control valves, and a plurality of pneumatic cylinders. Each cylinder provides the means by which portions of the fixture, such as clamps, arms, and fingers, are caused to move. Each cylinder is connected to a corresponding control valve, which is associated with a particular cam. The plurality of cams are arranged to actuate the corresponding control valves in a particular sequence, whereby the fixture sequentially steps through its operations. After all operations have been completed, the fixture unclamps the ribbon and returns all apparatus to its starting positions.

The present invention is the first welding fixture to provide the industry with all the features necessary to consistently produce a high quality weld in a continuous loop ribbon. Precise alignment of ribbon of all sizes eliminates one problem and results in continuous loop ribbons which are consistently straight in the region of the weld. Separating the cutting operation from the welding operation substantially reduces wear on the welder horn, which never contacts the welding anvil in the present invention, and thereby saves the manufacturer the replacement costs of worn welder horns. The tailed description and claims and by referring to the accompanying drawings.

BRIEF DESCRIPTION OF THE DRAWINGS

For a detailed description of the preferred embodiment of the invention, reference will now be made to the accompanying drawings wherein:

FIGS. 1-3 show a diagrammatical overview of the general ribbon welding process performed in accordance with the principles of the present invention;

FIGS. 4A and 4B show the welded ribbon depicted in FIG. 3 in cross sections along a line 4—4 shown in FIG. 3;

FIG. 10 shows a side elevation of the right rear side of the welding fixture disclosing a right arm assembly and a ribbon clamp assembly;

FIG. 11 shows a cross-sectional view of the right arm assembly taken along a line 11—11 in FIG. 10;

FIG. 12 shows a left arm assembly in a side elevation of the left rear side of the welding fixture;

FIG. 13 shows an anvil tract assembly in a cross section taken along a line 13—13 shown in FIG. 7;

FIG. 14 shows a welding anvil in a cross section taken along a line 14—14 in FIG. 13;

FIG. 15 shows an ironing anvil in a cross section taken along a line 15—15 in FIG. 13;

FIG. 16 shows a sensor arm and cutter assembly in a perspective view of a portion of the rear of the welding fixture;

FIG. 17 shows a top elevational view of a sensor arm and cutter assembly;

FIG. 18 shows the lower portion of the sensor arm and cutter assembly in a cross section taken along a line 18—18 in FIG. 17;

FIG. 19 shows a cutter mechanism in a cross section taken along a line 19—19 depicted in FIG. 18;

FIG. 20 shows a schematic diagram of a pneumatic control system for the welding fixture.

DESCRIPTION OF THE PREFERRED EMBODIMENT

Figure 5:
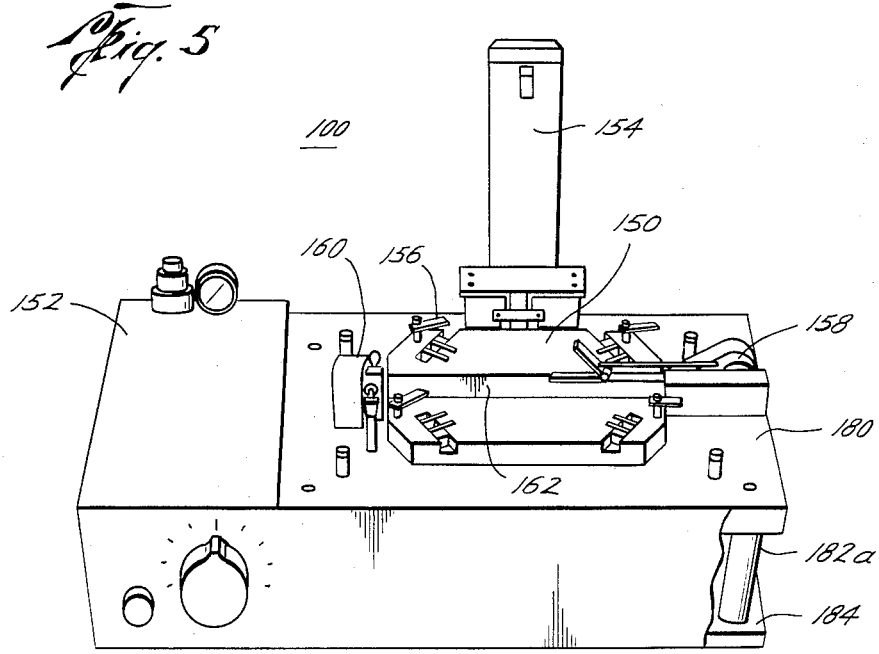
FIG. 5 shows a perspective view of a welding fixture structured according to the principles of the present invention.

The present invention is directed to a method and apparatus for efficiently and accurately adjoining the two ends of a length of fabric ribbon, particularly nylon ironing anvil 106 includes a flat ironing surface 110 having substantially greater width than the land surface 108. The welding anvil 104, the ironing anvil 106, and the track 102 are described and depicted in greater detail below in the section entitled "The Track Assembly."

Referring to FIG. 1, a length of nylon fabric ribbon, shown generally at 112, lies in crisscross relationship respective to the land surface 108 of the welding anvil 104. A right end 114 of the ribbon 112 is first positioned, as described below in greater detail, across the welding anvil, extending from the front right corner 118 of the fixture 100 to the rear left corner 124 of the fixture 100. Next, the left end 116 of the ribbon 112 is twisted 180 degrees counterclockwise (viewing the end of the ribbon as shown by the arrow at 126) to form a semicircular spiral 128 therein. The left end 116 is then positioned atop the right end 114, according to the process described below in greater detail. The crisscross configuration of the ends 114, 116 forms an acute angle 130 of 60 degrees and an obtuse angle 132 of 120 degrees. The ribbons are arranged on the welding anvil 104 so that the centerline of the land surface 108 along its lengthwise dimension bisects the acute angle 130.

Referring still to FIG. 1, after the ends 114, 116 of the ribbon 112 have been properly positioned, the welder (not shown) is actuated to form a weld bead 134 across the intersecting portion of the ribbon ends 114, 116 adjacent to the land surface 108. Thereafter, a cutting mechanism (not shown), separate and apart from the welder, precisely severs the ends of the ribbon 112 along the weld bead 134. The severed ends of the ribbon 112 are then removed and discarded.

Thus, FIG. 2 shows the ribbon 112 after the severed ends thereof have been removed. Next, the ironing anvil 106 is positioned beneath the weld bead 134 and the left end 116 of the ribbon 112 is rotated clockwise so as to remove therefrom the spiral 128 and form a linear extension of the right end 114 of the ribbon 112. The fully extended ribbon 112 is shown in FIG. 3.

FIGS. 4A and 4B reveal a cross section of the ribbon 112, along the line 4—4 shown in FIG. 3, following the welding operation and extension of the ribbon. FIG. 4A shows the presence of a nub 136 along the weld bead 134. The nub 136 results from the folded position of the ribbon 12 during the welding operation. In order to reduce interference by the weld bead 134 with subsequent use of the ribbon 112 in an impact printer, an ironing operation is performed whereby the nub 136 is eliminated. The weld bead 134 is positioned along the ironing surface 110 of the ironing anvil 106 and the welder is used to reheat the ribbon 112 in the region of the weld bead 134 to eliminate the nub 136. FIG. 4B shows the ribbon 112 and the weld bead 134 after the ironing operation has eliminated the nub 136.

THE WELDING FIXTURE

Referring now to FIG. 5, there is shown therein a welding fixture 100 structured according to the principles of the invention. The welding fixture 100 includes a guide and switch plate assembly 150, a pneumatic control assembly 152, a sensor arm and cutter assembly 154, four ribbon clamp assemblies 156, a right arm assembly 158, a left arm assembly 160, and a track assembly 162. Each of the foregoing component assemblies is described in some detail below.

Figure 6:
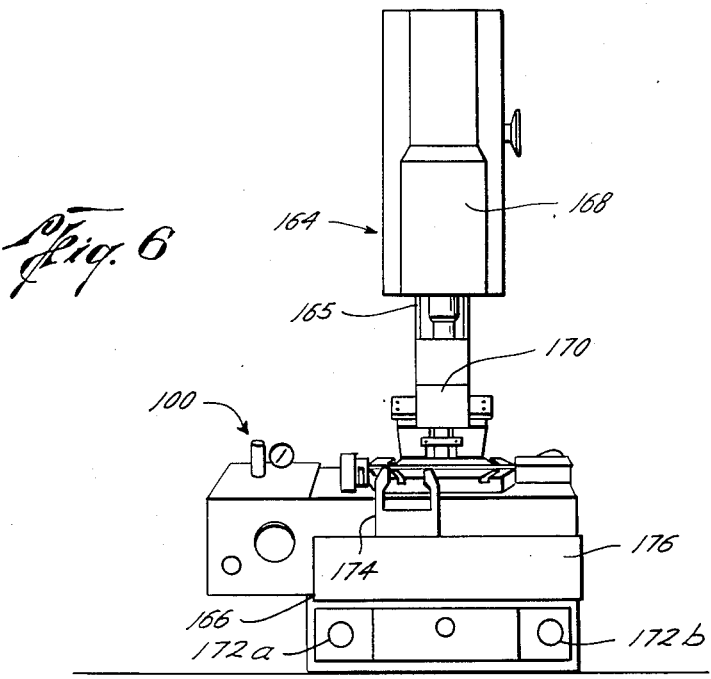
FIG. 6 shows a perspective view of a welding apparatus with the welding fixtures of FIG. 5 disposed thereon.

Referring now to FIG. 6, there is shown a welder apparatus 164 with the welding fixture 100 positioned thereon. The welding apparatus 164 includes a welding table 166 supporting the fixture 100, a carriage arm 165 extending upwardly from the rearward portion of the table 166, a welder carriage 168 slidably supported on the carriage arm 165, and a welder horn 170 extending downwardly toward the fixture 100 from the carriage 168. The welder table 166 includes a pair of actuation switches 172a, 172b, which are simultaneously actuated in push-button fashion to initiate the downward stroke of the welder carriage 168.

GUIDE AND SWITCH PLATE ASSEMBLY

Referring briefly to FIG. 5, there is shown a switch plate 180 adjustably supported atop four columns 182a–d, one column positioned at each of the four corners of the switch plate 180. The columns 182 extend generally vertically from a base plate 184. The switch plate 180 and the base plate 184 are generally rectangular plates having approximately the same length and width dimensions. The switch plate 180 is preferably formed from aluminum with a thickness of approximately 1.0 inch. The base plate 184 is preferably formed from aluminum with a thickness of approximately 0.5 inch. The material from which the plates are manufactured and the thicknesses of the plates may vary so long as comparable strength and rigidity are retained.

Figure 7:
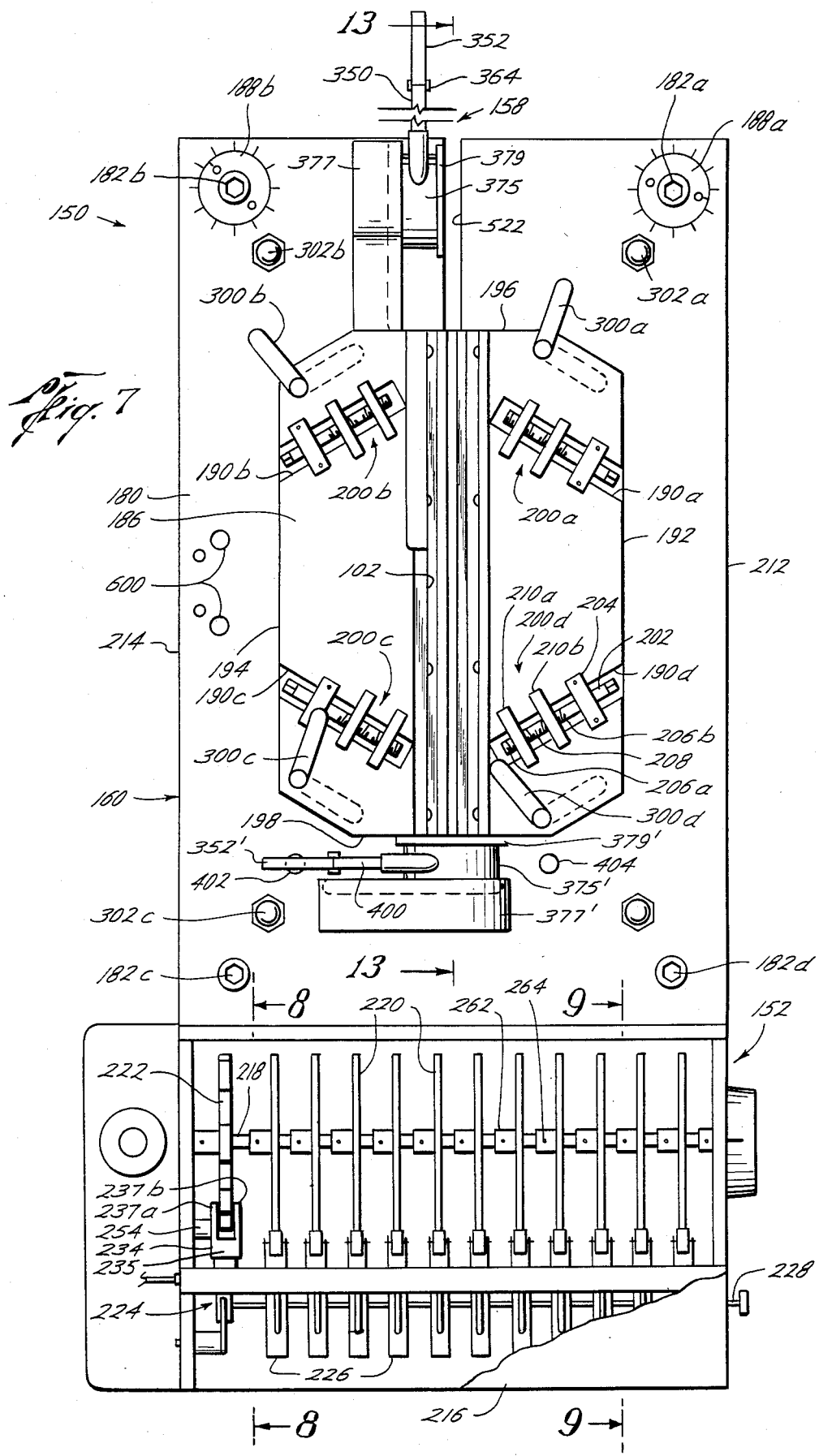
FIG. 7 depicts a top plain view of the welding fixture with portions thereof removed so as to disclose details of the apparatus.

Referring now to FIG. 7, there is shown a top view of the switch plate 180 showing disposed thereon a guide plate 186. The guide plate 186 is preferably machined from a rectangular aluminum plate having a thickness of approximately 1.0 inch or any thickness suitable for the purposes and structure of the guide plate 186 as stated below. The end faces of the four corners of the guide plate 186 are bevelled, as described in greater detail in the section entitled "The Ribbon Clamp Assemblies." The guide plate 186 further includes down the center of the lengthwise dimension thereof a V-shaped cut or track 102 described below in greater detail in the section entitled "The Track Assembly." The two support columns 182c, 182d on the left side of the guide and switch plate assembly 150 are bolted to the switch plate 180 through self-leveling washers (not shown). Self-leveling washers permit adjustment of the height of the right end of the switch plate 180 relative to the base plate 184 (see FIG. 5) while maintaining a rigid attachment of the switch plate 180 to the two left columns 182c, 182d.

The switch plate 180 includes a pair of level adjustment mechanisms 188a,b, positioned within the switch plate 180 above the right support columns 182a,b. The mechanisms 188a,b are threadedly engaged within the switch plate 180 above the support columns 182a,b. Rotation of the mechanisms 188a,b by use of a spanner wrench permits fine adjustment of the level of the switch plate relative to the adjacent support columns 182a,b, by as much as approximately 0.030 inch. Once the switch plate 180 has been leveled, the plate is bolted to the support columns through the level adjustment mechanisms 188a,b.

Referring still to FIG. 7, an adjustment channel 190a–d is machined into the upper surface of the guide plate 186 in each of the four corners thereof. Front adjustment channels 190a, 190d extend from a front lengthwise face 192 of the guide plate 186 toward, but not intersecting, right and left end faces 196, 198, respectively. The centerlines of the front adjustment channels 190a, 190d form acute angles of 60 degrees with respect to the plane of the front face 192. The orientation of the two rear adjustment channels 190b, 190c relative to the rear lengthwise face 194 of the guide plate 186 is symmetric with respect to the centerline of the V-shaped track 102 to the two front adjustment channels 190a, 190d.

There is included within each adjustment channel 190 a left and right lead screw adjustment mechanism 200a–d. The lead screw mechanism 200 of each adjustment channel 190 is identical, so that description of a single mechanism 200 shall suffice as a description of all four mechanisms. Each mechanism 200 includes a shaft 202 rotatably supported along the centerline of the adjustment channel 190 by a support housing 204. The support housing 204 is affixed to the upper surface of the guide plate 186 by means of screws. The shaft 202 includes opposing left and right threads 206a, 206b disposed symmetrically about a center alignment space 208. A pair of guide bars 210a, 210b include opposing bores therethrough for receiving the opposing left and right threads 206a, 206b, respectively, of the threaded shaft 202. The guide bars 210a, 210b extend generally perpendicularly from the shaft 202 toward the center of the guide plate 186. Rotation of the shaft 202 causes simultaneous movement of the guide bars 210a, 210b either toward or away from one another, depending upon the direction of rotation of the shaft 202.

The position of the center alignment point 208 within the adjustment channel 190d, as determined by the position at which the support housing 204 is attached to the guide plate 186, is selected so that a perpendicular projection from the shaft 202 through the center of the space 208 passes through a corresponding center point of a space 208 on a corresponding shaft 202 within the opposing adjustment channel 190b. The left and right lead screw mechanisms 200 are similarly positioned within the second opposing pair of adjustment channels 190a, 190b. The guide bars 210a, 210b from each of the four lead screw mechanisms 200 thereby define with precision the alignment path of the ribbon which is to be welded. Rotation of the shaft 202 permits adjustment of the width of the alignment path whereby the operator may quickly and precisely alter the set-up of the welding fixture 100.

PNEUMATIC CONTROL ASSEMBLY

Referring still to FIG. 7, there is shown a top view of the pneumatic control assembly 152 having a sheet metal cover 216 thereof cut away to reveal apparatus therewithin. It should be understood that while the control apparatus disclosed in the preferred embodiment of the present invention consists only of pneumatic apparatus, a welding fixture having electrical or electromechanical control apparatus could be constructed by one skilled in the pertinent arts according to the principles of the present invention. The pneumatic control assembly 152 includes apparatus for controlling the operation of the welding fixture 100. The assembly comprises a cam shaft 218, a plurality of cams 220, a ratchet drive gear 222, a ratchet drive mechanism 224, a plurality of pneumatic control valves 226, one for each cam 220, and a reset mechanism 228.

The cam shaft 218 is rotatably supported between the front face 212 and the rear face 214 of the welding fixture 100 at the left end (as viewed from the front face 212) of the switch plate 180. The ratchet drive gear 222 is affixed to the cam shaft 218 at the rearward end thereof. The cams 220 are attached to the cam shaft 218 at spaced intervals between the front face 212 and the drive gear 222. The pneumatic control valves 226 are affixed at spaced intervals along a line adjacent and to the left of the cams 220, as described further below.

Figure 8:
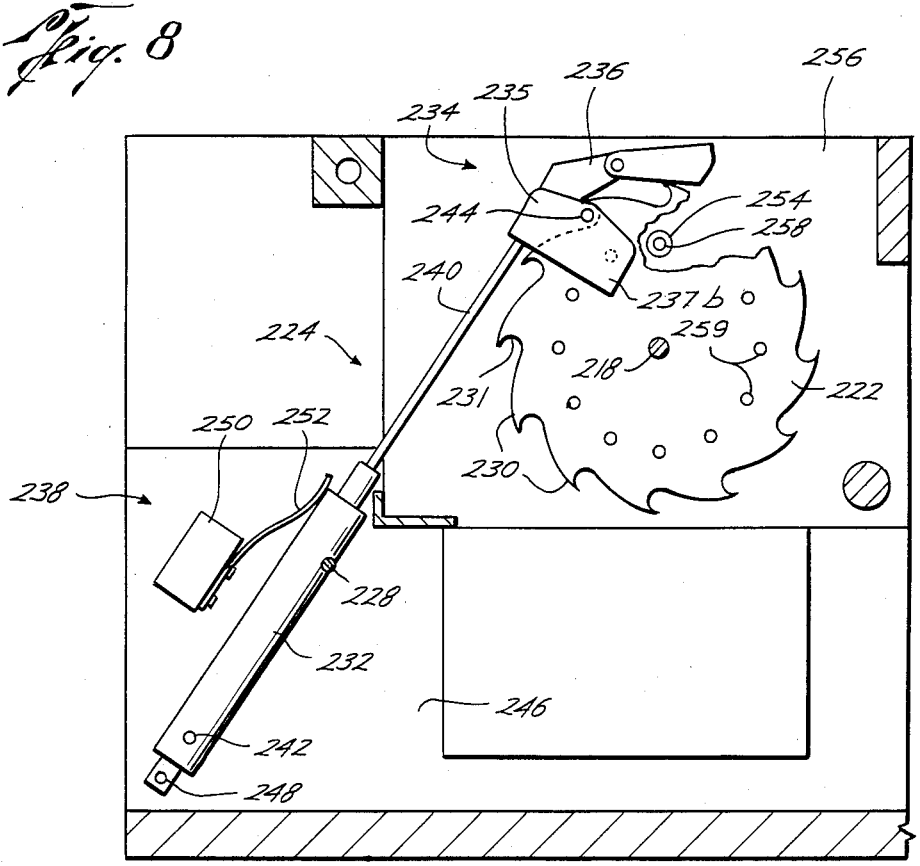
FIG. 8 shows a ratchet drive gear and drive mechanism in a cross section taken along a line 8—8 in FIG. 7.

Referring now to FIG. 8, there is shown a cross section of the assembly 152 taken along a line 8—8 shown in FIG. 7. FIG. 8 dislcoses the ratchet drive gear 222 and the ratchet drive mechanism 224 in elevation. The ratchet drive gear 222 includes an axial bore therethrough for fixedly receiving the shaft 218. The gear 222 further includes a plurality of ratchet teeth 230, which may be engaged by the drive mechanism 224 to cause the drive gear 222 to rotate through a predetermined arc.

The drive mechanism 224 includes a pneumatic cylinder 232, an engagement mechanism 234, a detent pawl 236, and a biasing mechanism 238. The pneumatic cylinder 232 may be, for example, a Bimba cylinder Model No. 021-NRP or any suitable pneumatic cylinder having a generally hexagonal shaft 240 biased by means such as an internal spring to a normally retracted position and extending the hexagonal shaft 240 in response to fluid pressure applied through a fluid port 242. The pneumatic cylinder 232 is pivotally attached at the base thereof to a generally vertically extending lower side plate 246 at a pivot point 248.

The engagement mechanism 234 includes a bore (not shown) into which is fixedly received the upper end of the hexagonal shaft 240 of the pneumatic cylinder 232. The hexagonal shaft 240 substantially limits rotational motion of the shaft 240 about its longitudinal axis. Referring briefly to FIG. 7 (wherein, for the sake of convenience, the pneumatic control assembly is shown without the detent pawl 236) there is shown a top view of the engagement mechanism 234 wherein it is disclosed that the mechanism 234 includes a solid portion 235 for securely receiving the shaft 240 and a pair of side portions 237a,b extending from the solid portion 235 and receiving therebetween the drive gear 222. Referring again to FIGS. 7 and 8, the engagement mechanism 234 further includes an engagement bar 244 extending between and securely attached to the side portions 237a,b of the engagement mechanism 234, whereby the engagement bar 244 may be received within complementary indentations 231 defined by the ratchet teeth 230.

The detent pawl 236 is configured in a manner well known in the art so as to limit the stroke of the shaft 240 by engaging a surface on the ratchet gear 222 at the upper limits of the stroke, as depicted in FIG. 8, and thereby halting movement of both the shaft 240 and the gear 222.

The biasing mechanism 238 includes a support block 250 and a leaf spring 252. The support block is fixedly attached by appropriate means to the lower side plate 246. The leaf spring 252 is attached at one end by means such as a screw to the support block 250 and arranged to make a downwardly biasing contact against an upper end surface of the cylinder 232. The leaf spring 252 thereby causes the engagement bar 244 of the engagement mechanism 234 to maintain contact against the drive gear 222, so that the engagement bar 244 engages the appropriate ratchet tooth 230 on extension of the shaft 240. Referring still to FIG. 8, a portion of the ratchet drive gear 222 near the top thereof has been cut away to reveal a locking mechanism 254 extending outwardly from an upper side plate 256. The upper side plate 256 and the lower side plate 246 may be portions of a single side plate. The locking mechanism 254 includes a small sphere 258 received within a bore in the mechanism 254 and biased against the side of the ratchet drive gear 222. The drive gear 222 includes a plurality of through bores 259 spaced around the perimeter of the drive gear 222, so as to receive the biased sphere 258 therewithin when the detent pawl 236 has stopped rotation of the drive gear 222. The biased sphere 258 rides along the side of the drive gear 222 until it pops into a bore 259, whereupon the drive gear 222 is inhibited from rotation in the counterclockwise direction (as viewed facing FIG. 8).

Figure 9:
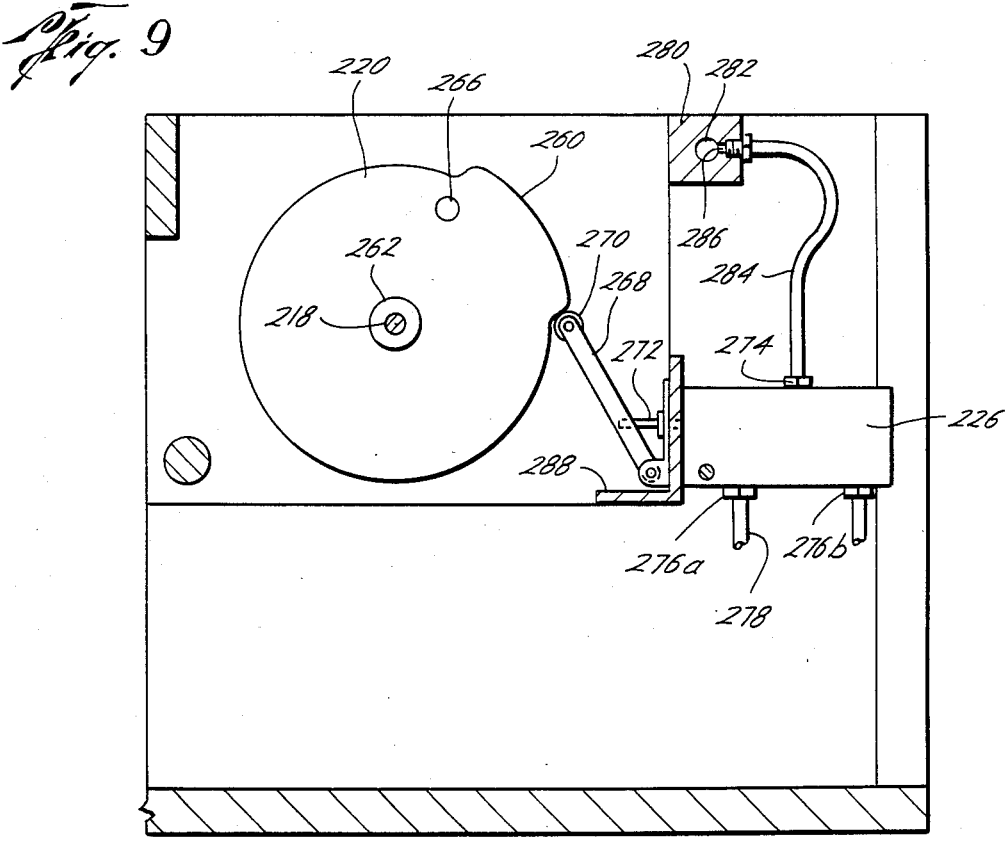
FIG. 9 shows a cam and pneumatic control valve in a cross section taken along a line 9—9 in FIG. 7.

Referring now to FIG. 9, there is shown a cross section of the pneumatic control assembly 152 along a line 9—9 shown in FIG. 7. FIG. 9 discloses an elevation of a cam 220 and apparatus associated therewith. Each cam 220 includes a lobe 260 for actuating a corresponding pneumatic control valve 226, which functions as a switch in the pneumatic control system for the welding fixture 100. The cam and associated apparatus depicted in FIG. 9 is representative of each cam 220 and associated apparatus within the pneumatic control assembly 152, with the exception that the arcuate length and relative position of the lobe 260 may vary with each cam 220 according to timing of the function controlled by the corresponding control valve 226. The relative position of the lobe 260 on each cam 220 may be discerned from the section below entitled "The Pneumatic Control System."

Referring still to FIG. 9, the cam 220 includes therethrough an axial bore through which is fixedly received a shaft housing 262. The shaft housing 262 is also disclosed in the top view shown in FIG. 7. The shaft housing 262 includes an axial bore for slidably receiving the cam shaft 218 and a threaded radial bore 264 (see FIG. 7) for receiving a set screw which, when tightened, locks the shaft housing 262 against the cam shaft 218. The cam 220 further includes an orientation bore 266 to facilitate proper alignment of the cam 220 relative to each of the other cams 220 prior to locking the shaft housing 262 of each cam 220 against the cam shaft 218.

The pneumatic control valve 226, shown in FIG. 9, is attached to an angled metallic channel 288 which spans from the front face 212 to the rear face 214 of the fixture 100 (see FIG. 7). It may be, for example, a four-way pneumatic valve such as a Clippard Valve Model No. NAV-4 or any suitable pneumatic valve capable of switching a supply of fluid pressure between two exhaust ports. The control valve 226 includes a pivot actuator 268 having on the upper end thereof a rotatable roller 270 biased against the cam 220 by means of a shaft 272 of the control valve 226. The roller 270 follows the circumferential contour of the cam 220, and, when in contact with the lobe 260, causes the pivot actuator 268 to depress the shaft 272 of the control valve 226, which in turn switches the valve 226.

The pneumatic control valve 226 is provided with a fluid pressure input port 274 which is constantly pressurized from a source of fluid (not shown). The valve 226 further includes a pair of fluid output ports 276a, 276b. When the shaft 272 of the valve 226 is extended, fluid pressure received through the input port 274 is channeled to the first output port 276a. The first output port 276a may include a connection through a fluid tubing 278, as shown in FIG. 9, for the purpose of performing some control function or may be selaed (not shown), if not required to permform a control function. The status of the first output port 276a for each control valve 226 within the pneumatic control assembly 152 is disclosed in the section below entitled "The Pneumatic Control System."

When the shaft 272 of the valve 226 is depressed by the coincidence of the pivot actuator roller 270 on the lobe 260, fluid pressure received at the input port 274 is channeled through the valve 226 to the second output port 276b. Fluid pressure is delivered from a source (not shown) through an axial bore 282 within a metallic channel 280 which extends from the rear of the pneumatic control assembly 152 to the front thereof. The input port 274 of each control valve 226 is connected through appropriate fluid tubing 284 and an intersecting bore 286 to the axial bore 282 and thereby to the supply of fluid pressure.

Referring again to FIGS. 7 and 8, the reset mechanism 228 comprises a metallic shaft which, when depressed, causes the pneumatic cylinder 232 and shaft 240 thereof to pivot away from the drive gear 222. The engagement mechanism 234 is thereby disengaged from the teeth 230 of the drive gear 222, allowing the cam shaft 218 to be rotated freely to the starting position.

THE RIBBON CLAMP ASSEMBLIES

Referring again to FIG. 7, there is depicted therein four ribbon clamps 300a-d in fully open position and four corresponding button-actuated clamp switches 302a-d. The ribbon clamps 300a-d are positioned in each of the four bevelled corners of the guide plate 186 so as to assume a position in contact with the guide plate 186, adjacent and parallel to a corresponding adjustment channel 190a-d, when actuated. The clamp switches 302a, 302c are positioned on and within the switch plate 180 near the corresponding ribbon clamps 300a, 300c, respectively, and are centered on a line which intersects the center point of the center spaces 208 of the shafts 202 affixed within the alignment channels 190a, 190c. The clamp switches 302a, 302c are thereby colinear and are precisely aligned with the centerline of the ribbon placed in the fixture for welding. The clamp switches 302b, 302d are similarly arranged. When an operator actuates a clamp switch 302 by depressing it, the corresponding ribbon clamp 300 rotates through an arc of approximately 100 degrees and drops downward into contact with the upper surface of the guide plate 186 to grip the ribbon.

The bevelled end faces at the corners of the guide plate 186 enable the operator to maintain the ribbon in alignment during the clamping process. Were the end faces of the corners not bevelled along a line parallel to the adjacent lead screw mechanism 200, the corner edges of the guide plate 186 would tend to bias the ribbon out of alignment as the ribbon clamp switches 302 are being depressed. Hence, the bevelled corners are an essential feature of the present invention.

Referring now to FIG. 10, the welding fixture 100 is depicted in elevation from the rear side 214 (FIG. 7) thereof with the rear sheet metal panel removed to reveal apparatus between the switch plate 180 and the base plate 184. The right rear ribbon clamp 300b and the right rear clamp switch 302b are shown therein and described below in detail. Description of a single ribbon clamp and corresponding switch is a sufficient description of the other three identical ribbon clamps and corresponding clamp switches.

The ribbon clamp 300b includes a pneumatic cylinder 304, a shaft 306, a gripper mechanism 308, a lower shaft support 320, and a shaft guide mechanism 310. The cylinder 304 may be, for example, a Bimba 010.5-

DXDE or any similarly arranged pneumatic cylinder suitable in structure to perform the functions set forth below. The cylinder 304 is positioned between the switch plate 180 and the base plate 184 so as to permit the shaft 306 of the cylinder 304 to extend from a point below the cylinder 304 to a point well above the cylinder. The portion of the shaft 306 extending above the guide plate 186 can be a pinned extension of the actual cylinder shaft, as necessary to provide appropriate dimensions therefor.

As depicted in FIG. 10, the cylinder 304 is affixed by means such as a threaded engagement to the lower surface of the switch plate 180. The upper end of the shaft 306 extends above the cylinder 304 through coaligned cylindrical bores 312, 314 in the swtich plate 180 and the guide plate 186, respectively, to a point approximately 1.0 inch beyond the upper surface of the guide plate 186.

The gripper mechanism 308 includes a horizontal support bar 316 extending generally perpendicularly from and rigidly affixed to the upper end of the shaft 306. A flexible pad 318, for example, a block of rubber, is rigidly attached to the lower surface of the horizontal support bar 316 for adhesively gripping the ribbon against the upper surface of the guide plate 186.

The lower end of the cylinder 304 is pin-connected to the cylindrical lower shaft support 320, which extends at its lower end within the shaft guide mechanism 310. The lower shaft support 320 includes at the lower end thereof a small-diameter steel pin 326 extending generally horizontally therethrough. The shaft guide mechanism 310 is preferably formed from a solid cylindrical section of teflon. The mechanism 310 includes an axial bore 322 coaxially aligned with the support shaft 320. The inside surface of the bore 322 includes a pair of spiral channels 324, one of which is shown in phantom notation in FIG. 10, arranged so as to be constantly 180 degrees opposed.

The spiral channels 324 begin at the upper end of the guide mechanism 310 and include a short vertical drop, for example 0.5 inch, across a spiral arc of approximately 100 degrees and end with a substantially vertical span, for example 0.5 inch, to a point near the base plate 184. The steel pin 326 through the lower end of the support shaft 320 extends into both of the spiral channels 324, whereby vertical motion of the shaft 306 causes the pin 326 to engage the inside walls of the two spiral channels 324 and thereby rotates the shaft 306 on its vertical axis. The final vertical span of the spiral channels 324 within the lower portion of the guide mechanism 310 insures that the ribbon is gripped against the guide plate 186 from directly above the ribbon, so that the alignment of the ribbon is not disturbed. The relative dimensions of the apparatus comprising the ribbon clamp 310 are arranged so that the flexible pad 316 firmly engages the upper surface of the guide plate 186 in gripping contact before downward vertical motion of the shaft 306 is obstructed by contact between the lower end of the shaft 306 and the base plate 184.

The cylinder 304 further includes a pair of fluid ports 328a,b, for delivering and exhausting pressurized fluid from the interior of the cylinder 304, so as to generate vertical motion of the shaft 306.

The clamp switch 302b is a manually actuated, spring-loaded pneumatic valve, such as a three-way normally closed valve manufactured by A.D.I., Model No. 03-01-06. The switch 302 includes an air supply port 330 which is constantly pressurized from a continuous source of pressurized fluid (not shown) and a connecting port 332. When the clamp switch 302 is actuated by momentary depression of the upper surface thereof, the connecting port 332 is momentarily placed in fluid communication with the air supply port 330, whereby a short blast of pressurized fluid is delivered to the connecting port 332. From the connecting port 332, the pressurized fluid is communicated through the pneumatic circuit (described in detail in the section below entitled "The Pneumatic Control System") to the ratchet drive mechanism of the pneumatic control assembly, where it causes the ratchet drive gear to rotate one step.

Rotation of the ratchet drive gear causes simultaneous rotation of each of the cams in the pneumatic control assembly, which in turn actuates corresponding control valves associated with each of the cams. The control valve of one particular cam is connected to the cylinder 304 of the ribbon clamp 300b. The said cam includes a lobe which is oriented on the cam so that momentary depression of the right rear clamp switch 302b, at the proper point during the operating cycle of the welding fixture 100, causes the lobe on the said cam to actuate the corresponding control valve, as described above in the section entitled "The Pneumatic Control Assembly," whereby a supply of pressurized fluid is delivered to the upper port 328a of the cylinder 304 so as to cause downward vertical motion of the shaft 306.

The ribbon clamp 300b is later raised when the relevant cam releases the corresponding control valve. As will be apparent from the description in the section below entitled "The Pneumatic Control System," upward vertical motion of the cylinder shaft 306 is not caused by manual depression of the clamp switches 302 but rather follows from automatic operation of the welding fixture 100.

THE RIGHT ARM ASSEMBLY

FIGS. 7, 10, and 11 depict various views of the right arm assembly 158 in its outward position. FIG. 7 shows a top view of the switch plate 180 with the right arm assembly 158 positioned on the right side thereof. FIG. 10 depicts the right arm assembly 158 in a rear side elevation. FIG. 11 shows a cross section of the assembly 158 taken along a line 11—11 shown in FIG. 10. Referring to FIGS. 7, 10, and 11, the right arm assembly comprises an elongated arm 350, a thumb 352, a finger 354, a rotating mechanism 356, and a grasping mechanism 358.

The right arm assembly 158 is designed to rotate through a 180-degree arc between the outward horizontal position depicted in FIGS. 7, 10, and 11 and an inward horizontal position where the arm 350 rests on the guide plate 186 in front of the right rear corner thereof. The right arm assembly 158 performs the service of grasping the waste ends of the ribbon and removing them from the fixture 100 after they have been severed from the welded ribbon.

The elongated arm 350 comprises a generally linear metallic element having a length sufficient to enable the thumb 352 and the finger 354, when closed, to grasp the left ribbon end at the right rear side of the guide plate 186. The outwardmost end of the elongated arm 350 is machined to define the thumb 352. Such machining may, for example, include a reduction of the cross-sectional area of the element comprising the arm 350 for a short length, for example, 1.5 inches, to define the thumb 352. The inner surface of the thumb 352 is preferably machined to include a plurality of serrated edges or teeth 360 for the purpose of facilitating a secure grip on the ribbon.

The finger 354 similarly is formed of a machined metallic element having a cross section substantially similar to that of the thumb 352. The finger 354 includes teeth 362 arranged to mesh with the opposing teeth 360 of the thumb 352. The inner end of the finger 354 is pivotally attached to the arm at 350 at a point 364 near the thumb 352 and is also pivotally attached to a finger closure extension bar 366, which is coupled to a cylinder shaft, as described below, so as to enable the finger 354 to rotate into the closed position in response to motion by the extension bar 366 along a single dimension.

Referring still to FIGS. 7, 10, and 11, the rotating mechanism 356 includes a pneumatic cylinder 370, a drive gear 372, a rotating gear 374, and an arm support housing 375. The cylinder 370 may be, for example, a Bimba Model No. 022-DXP, or any cylinder suitable for extending a shaft and retracting the same in response to fluid pressure applied to one of two ports. The cylinder 370 includes a shaft 376 which is pivotally attached at its outer end to the drive gear 372 near the perimeter thereof. The lower end of the cylinder 370 is pivotally attached to a support element 378, which is secured by means such as bolting to the base plate 184. A pair of pressurized fluid ports 380a,b, provides means for the inlet and outlet of pressurized fluid to and from the interior of the cylinder 370, whereby the shaft 376 may be extended and retracted. The stroke of the cylinder and/or the gear ratio between the drive gear 372 and the rotating gear 374 must be chosen so as to achieve the 180-degree rotational arc of the right arm 350.

The drive gear 372 is rotatably supported from a gear support block 382, which is secured to the lower surface of the switch plate 180. The rotating gear 374 is rotatably supported within a gear housing 377 on a gear support shaft 384, which is fixedly attached at one end in a bore within the gear housing 377 and at the opposite end by a shaft support bracket 379.

The arm support housing 375 is rotatably supported on one end of the support shaft 384. The housing 375, described in greater detail below, comprises a sealed, cylindrical metallic enclosure supporting in radial extension the arm 350 and arranged for rotation in accordance with rotation of the rotating gear 374.

The drive gear 372 meshes with and thereby causes rotation of the rotating gear 374. The rotating gear 374 is coupled by means of a pin 385 to the arm support housing 375, whereby both the rotating gear 374 and the support housing 375 rotate about the gear support shaft 384, in response to motion by the drive gear 372.

Referring still to FIGS. 7, 10, and 11, the grasping mechanism 358 comprises the apparatus by which the finger 354 is forced to close on the thumb 352, thereby enabling the right arm assembly 158 to grasp a ribbon end. The grasping movement results from actuation of a small cylinder, such as a Clippard Model No. 3PS-1/2, which is a single-acting, pneumatic cylinder, normally biased to the retracted position. The finger closure extension bar 366 forms a linear extension of the shaft of the small cylinder 386, so that when the cylinder 386 is actuated, the finger 354 closes on the thumb 352.

Fluid pressure for actuation of the small cylinder 386 is supplied through a fluid tubing 388 from a pneumatic control valve (not shown). The fluid tubing 388 passes through a cylindrical bore 390 in the switch plate 180 to a fitting in a bore 391 within the base of the gear housing 377. The gear housing bore 391 intersects an internal fluid passage within the support shaft 384, which passage provides a path for communication of pressurized fluid to the interior of the arm support housing 375. Sealed couplings 392 between the support shaft 384 and the arm support housing 375 permit rotation of the support housing 375 while the support shaft 384 remains fixed in position.

Ports (not shown) in the support shaft 384 deliver pressurized fluid from the fluid passage within the support shaft 384 to the interior of the arm support housing 375. The interior of the arm support housing 375 is sealed and in fluid communication with the interior of the small cylinder 386, whereby fluid pressure applied to the fluid tubing 388 is communicated to the interior of the small cylinder 386 and thereby translated into linear motion of the finger closure extension bar 366 coupled to the cylinder shaft.

The cylinder 370 and the small cylinder 386 are connected via fluid flow lines to appropriate control valves and corresponding cams, which are described above in the section entitled "The Pneumatic Control Assembly." The arm cylinder 370 is normally retracted and the small cylinder 386 is normally biased to a retracted position. Hence, the right arm assembly 158 is normally positioned inwardly atop the guide plate 186 with the finger 354 open. While the right arm assembly 158 is in the described normal position, the crossed ribbon ends are clamped into position on the guide plate 186. The clamping procedure places the rearward portion of the left ribbon end (at the right rear corner of the guide plate) between the thumb 352 and the finger 354 of the assembly 158. After the welding operation and before the cutting operation, the finger 354 is closed to grasp the ribbon. After the cutting operation, the arm 350 is rotated 180 degrees to remove the severed ribbon ends, which themselves have been welded together by the welding operation, from the guide plate 186. Thereafter, the finger is opened to release the severed ribbon ends into a collecting enclosure (not shown). Finally, the arm 350 is rotated back into position atop the guide plate 186.

THE LEFT ARM ASSEMBLY

The left arm assembly 160 is depicted in FIGS. 7 and 12. FIG. 7 is a top view of a portion of the welding fixture 100 showing the left arm assembly 160 affixed to the switch plate 180 at the left end face 198 of the guide plate 186. FIG. 12 depicts the left arm assembly 160 in a rear side elevation. The left arm assembly 160 is substantially identical in pertinent part to the right arm assembly 158. The apparatus of the left arm assembly 160 which is substantially identical to corresponding apparatus of the right arm assembly 158 is identified in FIGS. 7 and 12 with a primed reference character of the same number as the corresponding apparatus in FIGS. 10 and 11. The differences between the right and left arm assemblies 158, 160 are described below.

Because the left arm assembly 160 serves a purpose different from that of the right arm assembly 158, the left arm assembly 160 is oriented at 90 degrees with respect to the orientation of the right arm assembly 158. The axial centerline of the arm support housing 375' is coplanar with the centerline of the V-shaped track 102 within the guide plate 186. The left arm assembly 160 includes a shortened arm 400 having a length sufficient to place the thumb 352' and the finger 354' within the path of the ribbon at the front left corner or the rear left corner of the guide plate 186, depending upon the rotational position of the arm 400. The left arm assembly 160 further includes a rear support pedestal 402 and a front support pedestal 404 for the purpose of stabilizing the arm 400 and the ribbon grasped thereby, as further described below.

The left arm assembly 160 is normally positioned with the arm 400 pointing toward the front face 212 of the switch plate 180. The finger 354' is normally biased to the open position. With the left arm assembly 160 in the described position, the ribbon ends are clamped into the crossed pattern with the left ribbon end crossing between the thumb 352' and the open finger 354' at the front left corner of the guide plate 186. After the ribbon has been clamped to the guide plate 186, but before the welding operation begins, the finger 354' is closed to grasp the ribbon. After the welding and cutting operation, but before the ironing operation, the arm 400 is rotated 180 degrees, stopping at and being supported by the rear pedestal 402. After the ironing operation, the arm 400 is rotated 180 degrees to return to its forward position and the finger 354' is opened to release the welded ribbon.

THE TRACK ASSEMBLY

The track assembly 162 is shown in detail in FIGS. 13, 14, and 15. FIG. 13 shows an elevational cross section of a portion of the switch plate 180 and the guide plate 186 taken along a line 13—13 depicted in FIG. 7. FIG. 14 shows a cross section of the welding anvil 104 taken along a line 14—14 shown in FIG. 13. FIG. 15 shows a cross section of the ironing anvil 106 taken along a line 15—15 shown in FIG. 13. Referring now to FIGS. 13, 14, and 15, the track assembly 162 comprises the V-shaped track 102 within the guide plate 186, the welding anvil 104, the ironing anvil 106, and an anvil shift mechanism 500.

The V-shaped track 102 includes an upper surface which has been machined and ground to a smooth finish so as to enable precise alignment of the welding anvil 104 and the ironing anvil 106 and limited friction in movement of the same along the track surface.

The track 102 further includes a pair of longitudinal channels 502a,b, which are machined therein. A pair of hardened steel bars 504a,b, each having a rectangular cross section which conforms precisely to the dimensions of the channels 502a,b, are securely fasened within the channels 502a,b by screws 506, which are countersunk into the bars 504a,b. The steel bars 504a,b provide a means by which the centerline of the V-shaped track 102 may be shifted. Such an adjustment may be accomplished by removing the steel bars from the track 102, placing appropriate precision shims in the base of the channels 502a,b, and replacing the steel bars 504a,b.

Referring still to FIGS. 13, 14, and 15, the welding anvil 104 includes a surface 108 against which the ribbons are welded and a cutting edge for severing the ribbons along the weld bead. The welding surface or land surface 108 is a generally horizontal surface extending substantially the length of the welding anvil 104 and having a width in the range from 0.005 inch to 0.20 inch, depending on the requirements of the particular ribbon being joined. The cutting edge of the welding anvil 104 is a generally vertical surface along the rearward edge of the land surface 108, defining a lower cutting blade 508 which cooperates with an upper cutting blade (described below in the section entitled "The Sensor and Arm Cutting Assembly") in scissor fashion to sever the welded ribbon along the weld bead. The lower surfaces of the welding anvil 104 generally define a V-shaped cross section which conforms precisely to the cross-sectional dimension of the V-shaped track 102. As revealed in FIG. 14, the lower surfaces of the welding anvil 104 may define a second land surface 108 having, for example, a width different from the width of the first land surface.

The welding anvil 104 may further include a small welding pin 511 extending vertically in spaced relation to the lower cutting blade 508. The upper end of the welding pin 511 terminates in the same horizontal plane as the upper land surface 108. The welding pin 511 insures that the two severed ends of the ribbon are adjoined during the welding process with strength enough to enable the right arm assembly 158 (see FIG. 7) to remove both waste ends by grasping only one of the waste ends.

The ironing anvil 106 includes a generally horizontal upper ironing surface 110 against which the weld bead may be flattened during the ironing operation. The ironing surface 110 extends substantially the length of the ironing anvil 106 and has a width substantially greater than the width of the weld bead, for example, 0.25 inch. The lower surface of the ironing anvil 106 is machined to a cross section which conforms substantially to the dimensions of V-shaped track 102. The ironing anvil 106 and the welding anvil 104 both may be machined and ground from hardened steel.

The anvil shift mechanism 500 comprises a cylinder 510 having a shaft 512, a vertical shaft coupling 514, a perpendicular coupling extension 516, and an anvil coupling 518. The cylinder 510 is preferably a double-acting pneumatic cylinder, such as a Bimba Model No. 013-DX, having a pair of fluid ports 520a,b, whereby pressurized fluid delivered to one of the ports 520a,b causes extension or retraction of the cylinder shaft 512. The cylinder 510 is affixed by means such as brackets 526 and screws 524 to the lower surface of the switch plate 180 along the centerline of the V-shaped track 102 within the guide plate 186.

The vertical shaft coupling 514 comprises a strong, relatively inflexible linkage between the shaft 512 of the cylinder 510 and the two anvils 104, 106. The vertical coupling 514 may, for example, be a bar of aluminum machined to a length sufficient to span the distance between the shaft 512 and the anvils 104, 106, a width, approximately 0.25 inch, which spans closely the width of a coupling slot 522 in the switch plate 180 (see also FIGS. 7 and 11), and a depth sufficient to provide the necessary rigidity. The lower end of the vertical coupling 514 is secured to the outer end of the shaft 512. The upper end of the vertical coupling 514 is secured to the outer end of the coupling extension 516. The vertical coupling 514 further includes a ball bearing 517 which is rotatably connected via a pin shaft (not shown) to the front side of the coupling 514 and is seated on the upper surface of the switch plate 180 adjacent to the coupling slot 522. The ball bearing 517 limits the downward vertical load on the shaft 512 of the pneumatic cylinder 510.

The coupling extension 516 connects the welding anvil 104 to the vertical coupling 514. The anvil coupling 518 connects the ironing anvil 106 to the welding anvil 104. The relative lengths of the coupling extension 516 and the anvil coupling 518 are selected so as to center the welding anvil under the crossed ribbons while the shaft 512 is in the retracted position and so as to center the ironing anvil 104 under the crossed ribbons when the shaft 512 is in the extended position. Both the coupling extension 516 and the anvil coupling 518 should be formed of a material having sufficient rigidity to translate the horizontal motion of the shaft 512 into motion of the anvils 104, 106. The coupling extension 516, however, is preferably formed from a material, such as plastic tubing, having some flexibility to allow for a slight misalignment between the vertical coupling extension 516 and the centerline of the anvils 104, 106. Such a misalignment might occur when the centerline of the V-shaped track 102 has been shifted by placing precision shims within the bases of the longitudinal channels 502a,b.

In accordance with the description contained in the section entitled "The Pneumatic Control Assembly," after the welding and cutting operations are completed, pressurized fluid is delivered through a pneumatic control valve (not shown) to the appropriate port 520b of the pneumatic cylinder 510, causing extension of the cylinder shaft and shifting of the anvils 104, 106 to relocate the ironing anvil 106 under the weld bead on the adjoined ribbons. After completion of the welding operation, the relevant control valve is deactivated, applying pressurized fluid to the opposing port 520a of the cylinder 510 and thereby retracting the cylinder shaft 512 and realigning the anvils 104, 106.

SENSOR ARM AND CUTTER ASSEMBLY

The sensor arm and cutter assembly 154 is disclosed in FIGS. 16-19. FIG. 16 depicts a perspective view of the welding fixture from the left rear side thereof. FIG. 17 depicts a top view of the sensor arm and cutter assembly 154. FIG. 18 depicts a cross section of the assembly 154 along a line 18—18 shown in FIG. 17. FIG. 19 depicts a plain bottom view of a portion of the assembly 154.

Referring briefly to FIG. 7, the sensor arm and cutter assembly attaches in an upright position to the upper surface of the switch plate 180 at the rear 214 thereof by means of bolts through boreholes 600 in the switch plate 180.

Referring now to FIGS. 16-18, the sensor arm and cutter assembly 154 includes a support arm 602, a cutter mechanism 604, a pneumatic cylinder 606, and a welder sensor 608.

The support arm 602 comprises a generally vertically extending member having a substantially rectangular cross section. The two lengthwise, vertically extending rearward edges 610a,b may be machined, as shown in FIG. 17, to define counterbore channels for receiving a rear cover plate (not shown). As shown in FIG. 18, the lower end of the support arm 602 includes a slot 612 for receiving therethrough a cutter extension 618 which connects the cutter mechanism 604 to the pneumatic cylinder 606. The upper surface 614 of the support arm 606 includes a recessed track or channel 616 into which is secured the welder sensor 608. The support arm 602 may be machined from a bar of aluminum or steel so as to include the features described herein.

The welding sensor 608 includes a ball 620, a retaining nut 622, a pneumatic valve 624, and a housing 626. The ball 620 has a diameter which is slightly larger than the diameter of an opening in the retaining nut 622, so that the ball 620 may be biased from within the retaining nut 622 to protrude partially through the opening. The ball 620 is held in place within the retaining nut 622 by a shaft 628 extending from the valve 624. The shaft 628 is normally biased in extended position by, for example, a spring (not shown) within the valve 624. Fluid tubing lines 630a,b provide means for the entrance and exit of pressurized fluid into and out of the valve 624.

When the welder apparatus 164 (see FIG. 6) is actuated, upward and downward vertical motion of the welder carriage 168 (see FIG. 6) causes upper and lower cam surfaces (not shown) attached to the welder carriage 168 to contact and depress the ball 620. Vertical motion of the welder carriage 168 is thereby translated to horizontal motion of the ball 620, depressing the shaft 628 and thereby momentarily actuating the valve 624. Actuation of the valve 624 opens a path of fluid communication through the valve 624 between the fluid tubing lines 630a,b, generating a surge of pressurized fluid which is communicated by the appropriate fluid line 630 to the ratchet drive mechanism 224, described in the section entitled "The Pneumatic Control Assembly."

Referring now to FIGS. 16-19, the cutter mechanism 604 cooperates with the lower cutting blade 508 of the welding anvil 104 (see FIG. 14) to sever the ribbon precisely along a predetermined path within the weld bead. The cutter mechanism 604 comprises a cutter housing 634, a front plate 636, a cutter extension 618, an upper cutting blade 638, and a blade biasing mechanism 640. The cutter housing 634 comprises a generally rectangular member having a flat upper surface and a lower surface machined to define medial raised lands 642a,b, rearward raised lands 644a,b, and a T-shaped channel 646. The cutter housing 634 further includes a generally rectangular slot 648 which separates the left raised lands 642b, 644b from the right raised lands 642a, 644a. The lower end of the support arm 602 is received within the slot 648 between the rearward raised land surfaces 644a,b.

A housing shaft 650 is fixedly received through a pair of horizontally extending slots 632 within the lower end of the support arm 602. The outer ends of the housing shaft 650 are pivotally received within roller bearings (not shown) which are supported within the rearward raised lands 644a,b of the cutter housing 634. The cutter housing 634 is thereby able to pivot about the housing shaft 650 between a normally raised position, at approximately sixty degrees above a horizontal plane, to a substantially horizontal lowered position. A pair of set screws 633a,b intersecting each slot 632 within the support arm 602 at generally right angles thereto permit adjustment of the position of the housing shaft 650 so that the upper cutting blade 638 is properly aligned with the lower cutting blade 508 on the welding anvil 104.

The front plate 636 of the cutter mechanism 604 comprises a plate member forming a generally vertically extending face across the front of the cutter housing 634. The front plate 636 is affixed to the cutter housing 634 by means of screws 654. The lower surface of the front plate 636, at each end thereof, defines a downwardly facing V-shaped surface 652a,b for receiving therewithin and engaging the upper surfaces of the welding anvil 104. The V-shaped surfaces 652a,b lock the welding anvil 104 into position against the V-shaped track 102 within the guide plate 186 during the precision cutting period.

The upper cutting blade 638 is pivotally attached to the front plate 636 by means of a small bolt 656 extending through the front plate 636 and through a bore within the lower left end of the blade 638. The upper cutting blade 638 defines a tapered cutting edge 658 and a steadily decreasing cross-sectional area from the pivoting (left) end to the pivoted (right) end. The pivoted (right) end of the blade includes a rearwardly extending horizontal pin 660 for supporting the forward end of a flexible spring 662. The spring 662 is affixed at its rearward end to a forwardly facing surface of the medial right raised land 642a and extends generally forwardly to reach and circumscribe the horizontal pin 660 and thereby bias the pivoted (right) end of the upper cutting blade 638 against the inside (rearward) face of the front plate 636. The cutting blade 638 further includes a small bore in the rearward surface thereof for receiving therewithin, as described below, a portion of the cutter extension 618, whereby the cutting blade 638 is caused to move downward with respect to the front plate 636 and thereby sever the ribbon.

The cutter extension 618, which comprises a bar extending from the pneumatic cylinder 606 to the upper cutting blade 638, governs the motion of the cutter housing 634 and the upper cutting blade 638. The cutter extension 618 includes a shaft support block 664 affixed to the lower surface of the extension 618 approximately medially along the extension 618 and a pin extension 621. The support block 664 includes therethrough a cylindrical horizontal bore, extending substantially perpendicular to the lengthwise axis of the cutter extension 618, for pivotally receiving therethrough a cutter shaft 666. The cutter shaft 666 is supported at opposing ends thereof in cylindrical bores within the medial raised lands 642a,b of the cutter housing. The cutter shaft 666 and the support block 664 enable the cutter extension 618 to pivot about the shaft 666 in response to substantially vertically directed forces applied at the rearward end of the cutter extension 618. The pin extension 621 comprises a small-diameter element extending axially from the forward end of extension 618 to engage a small bore in the upper cutting blade 638. The pin extension 621 translates pivotal motion of the cutter extension 618 to pivotal motion of the blade 638.

The biasing mechanism 640 provides means by which the upper cutting blade 638 remains biased against the lower surface of the cutter housing 634 within the T-shaped channel 646 during motion of the cutter housing 634. The biasing mechanism 640 includes a cross bar 668 and a stiff spring 670. The cross bar 668 is mounted within recessed channels in the forward raised lands 642a,b by means of screws so as to be flush with the surface thereof and to define thereunder a path between the upper surface of the cross bar 668 and the T-shaped channel 646 of the cutter housing 634. The cutter extension 618 extends through the path and is biased against the T-shaped channel 646 by the stiff spring 670 which is affixed between the cross bar 668 and the cutter extension 618. The cross bar 668 further includes a set screw 672, adjustable from the lower side of the cross bar 668, whereby pivotal motion of the cutter extension 618 may be limited so as to prevent damage to the upper cutting blade 638 by contact with the welding anvil.

The rearward end of the cutter extension 618 is pivotally attached to a shaft 674 of the pneumatic cylinder 606. The pneumatic cylinder 606 is pivotally affixed at its upper end to the rearward surface of the support arm 602 and includes a pair of fluid ports 676a,b, whereby pressurized fluid may be delivered to and exhausted from the cylinder 606 for the purpose of extending and retracting the shaft 674. The shaft 674 normally is held in the extended position. Extension of the shaft 674 places a downward force from the rearward end of the cutter extension 618, which force is translated by the housing shaft 650 and the stiff spring 670 to an upward force on the cutter housing 634. Full extension of the cylinder shaft 674 raises the cutter housing 634 to an angle of approximately 60 degrees off the horizontal.

After the welding operation is completed, the cutting operation is commenced by pressurizing the appropriate fluid port 676b, to cause retraction of the shaft 674. Retraction of the shaft 674 causes downward rotation of the cutter housing 634 until the V-shaped surfaces 652a,b of the front plate 636 engage the welding anvil 104. Retraction of the shaft 674 after contact between the front plate 636 and the welding anvil 104 results in gradual compression of the stiff spring 670.

Compression of the stiff spring 670 is accompanied by three significant results. First, the welding anvil 104 is securely locked against the V-shaped track 102 of the guide plate 186. Second, the crossing ribbon ends are securely locked between the lower surface of the front plate 636 and the welding anvil 104. Third, the upper cutting blade 638 is brought into cutting engagement with the lower cutting blade 508 (FIG. 14) on the welding anvil 104, whereby the ribbon is precisely cut along the weld bead. The set screw 672 within the cross bar 668 is adjusted to limit downward motion of the upper cutting blade 638 so as to prevent damage to the blade 638 by contact with an upwardly facing surface of the welding anvil 104. After the shaft 674 has been fully retracted, the appropriate fluid port 676a is pressurized to again extend the shaft 674 so as to raise the cutting blade 638 and thereafter rotate the cutter housing 634 upwardly to its normal position.

THE PNEUMATIC CONTROL SYSTEM

Referring now to FIG. 20, there is shown therein a schematic diagram of the pneumatic control system 700 for the welding fixture. The control system 700 includes eleven pneumatic control valves 701–711 (reference character 226 in FIGS. 7 and 9), each of which is associated with a cam (reference character 220 in FIGS. 7 and 9) for controlling actuation of the corresponding valve, a source of pressurized fluid 714 for providing a supply of pressurized fluid to the control valves 710–711, a ratchet drive cylinder 716, an oscillating pneumatic timer circuit 718, four clamp switches 726a–d (302a–d in FIG. 7), and a plurality of pneumatic cylinders for effecting operation of the welding fixture.

The mechanics of the pneumatic control system 700 are best understood through a sequential description of its operation. Tables 1, 2, and 3 below provide information which facilitates an understanding of the operation of the pneumatic control system 700. Each of the control valves 701–711 and corresponding cams (not shown) is numbered 1 through 11 and controls operation of a particular apparatus of the fixture 100, which apparatus is manipulated by means of a pneumatic cylinder connected to the particular control valve. Table 1 provides a list of each of the control valves and the apparatus of the fixture 100 associated therewith.

TABLE 1

| Control Valve No. | Associated Apparatus |
|---|---|
| 1 | Left Arm |
| 2 | Left Front Clamp |
| 3 | Right Front Clamp |
| 4 | Welding Anvil/Ironing Anvil |
| 5 | Right Arm |
| 6 | Finger - Left Arm |

TABLE 1-continued

| Control Valve No. | Associated Apparatus |
| --- | --- |
| 7 | Finger - Right Arm |
| 8 | Left Rear Clamp |
| 9 | Right Rear Clamp |
| 10 | Oscillating Timer Circuit |
| 11 | Cutter Mechanism |

As pointed out in the section entitled "The Pneumatic Control Assembly," actuation of each of the control valves is controlled by the coincidence of a rotating cam against a pivot actuator which actuator opens and closes the associated control valve. Rotation of the cams is generated by rotation of a ratchet gear affixed to one end of the cam shaft in twelve substantially equal rotational arcs of 30 degrees each. Hence, one complete rotation of the ratchet gear in twelve separate steps corresponds to one complete cycle of operation for the fixture 100. Table 2 provides a summary of the twelve steps comprising a single operative cycle of the control system 700. Table 2 discloses for each step the control valve(s) involved, the operation(s) performed, and the rotational position of the corresponding cam at the time the relevant operation is performed.

TABLE 2

| Step No. | Control Valve No. | Operation | Cam Position |
| --- | --- | --- | --- |
| 1 | 3 | Right Front Clamp Down | 15° |
| 2 | 8 | Left Rear Clamp Down | 45° |
| 3 | 9 | Right Rear Clamp Down | 75° |
| 4 | 2 | Left Front Clamp Down | 105° |
| | 6 | Left Arm Finger Closed | 120° |
| 5 | Welder Sensor | Welder Down | External Source |
| 6 | Welder Sensor | Welder Up | Automatic |
| | 7 | Right Arm Finger Closed | 165° |
| | 11 | Cutter Mechanism Down | 180° |
| | 10 | Oscillating Circuit Start | 180° |
| 7 | | Oscillating Circuit Step | |
| 8 | | Oscillating Circuit Step | |
| | 2 | Left Front Clamp Up | 225° |
| | 8 | Left Rear Clamp Up | 225° |
| | 9 | Right Rear Clamp Up | 225° |
| | 11 | Cutter Mechanism Up | 240° |
| 9 | | Oscillating Circuit Step | |
| | 4 | Anvil Shift | 255° |
| | 5 | Right Arm Rotate Out | 255° |
| 10 | | Oscillating Circuit Step | |
| | 1 | Left Arm Rotate Over | 285° |
| | 7 | Right Arm Finger Open | 285° |
| | 10 | Oscillating Circuit Stop | 300° |
| 11 | Welder Sensor | Iron Down | External Source |
| 12 | Welder Sensor | Iron Up | Automatic |
| | 1 | Left Arm Return | 345° |
| | 3 | Right Front Clamp Up | 360° |
| | 4 | Anvil Return | 360° |
| | 5 | Right Arm Return | 360° |
| | 6 | Left Arm Finger Open | 360° |

Table 3 provides a list of the actions which cause the initiation of each of the twelve steps comprising a single cycle of operation of the fixture 100.

TABLE 3

| Step No. | Initiating Action |
| --- | --- |
| 1 | Operator Depresses Right Front Clamp Switch |
| 2 | Operator Depresses Left Rear Clamp Switch |
| 3 | Operator Depresses Right Rear Clamp Switch |
| 4 | Operator Depresses Left Front Clamp Switch |
| 5 | Operator Depresses Welder Start Buttons |
| 6 | Automatic Result of Welder Upward Motion |
| 7 | Automatic Result of Oscillating Timer Discharge |
| 8 | Automatic Result of Oscillating Timer Discharge |
| 9 | Automatic Result of Oscillating Timer Discharge |
| 10 | Automatic Result of Oscillating Timer Discharge |
| 11 | Operator Depresses Welder Start Buttons |
| 12 | Automatic Result of Welder Upward Motion |

Operation of the fixture 100 is commenced with the drive gear and cams in the zero degree position. The operator places the right ribbon end diagonally across the fixture so as to be aligned within the guide bars of the front right and left rear alignment channels 190a, 190c (FIG. 7). With the ribbon aligned within the guide bars and held substantially taut, the operator depresses the right front clamp switch 726a (302a of FIG. 7) with his or her right thumb, which is also grasping the ribbon. Such depressing action is facilitated by the colinear alignment of the clamp switches 302a–d (FIG. 7) with the ribbon alignment defined by the guide bars.

A normally closed input port 728a on the clamp switch 726a (which is a pneumatic valve) is connected directly to the pressurized fluid source 714. Depression of the switch 726a by the operator connects the input port 728a to a connecting port 730a and provides therethrough a fluid communication path whereby pressurized fluid flows from the input port 728a to the connecting port 730a, through a series of directional poppet valves 720a,c,d,e, a choke valve 722, a quick exhaust valve 724, and into the ratchet drive cylinder 716. The directional poppet valves 720a–e provide means for combining a pair of flow paths into a single flow path by limiting flow through each port in the poppet valve 720 to a single direction. The choke valve 722 includes an orifice of predetermined diameter whereby the volumetric flow rate of fluid through the choke valve 722 may be predetermined. The quick exhaust valve 724 provides an external vent of pressurized fluid at a relatively slow flow rate, whereby rapid changes in fluid pressure are communicated through the valve 724 and then slowly bled off. Hence, momentary actuation of the clamp switch 726a communicates a short burst of pressurized fluid to the ratchet drive cylinder 716, causing extension of the shaft of the cylinder 716 and consequent rotation of the ratchet drive gear for the first 30-degree step, in accordance with the description set forth in the section entitled "The Pneumatic Control Assembly."

During rotation of the cam shaft for the first 30-degree step, cam No. 3 actuates control valve No. 3, connecting the pressurized fluid source 714 directly to the retract port 732a of the right front ribbon clamp cylinder 734a. The application of pressurized fluid to ribbon clamp cylinder 734a at the retract port 732a causes the shaft of the cylinder to retract and the ribbon thereby to be clamped to the guide plate in accordance with the description set forth in the section entitled "The Ribbon Clamp Assemblies."

With the right ribbon end clamped at the front of the fixture, the operator next clamps the same ribbon end at the rear of the fixture by pulling the ribbon taut with his or her left hand, holding the ribbon in alignment between the appropriate guide bars, and depressing the left rear clamp switch 726c. Momentary depression of the left rear clamp switch 726c rotates the cam shaft through a second 30-degree step and thereby causes cam No. 8 to actuate control valve No. 8, so as to cause the left rear ribbon clamp cylinder 734c to retract its shaft and thereby clamp the ribbon.

In a manner consistent with the foregoing description regarding the clamping of the right ribbon end, the left ribbon end is clamped in crossing fashion after rotating the ribbon appropriately, as described in the section entitled "The Basic Process." The operator first clamps the ribbon at the right rear end of the guide plate by depressing the right rear clamp switch 726b to cause the cam shaft to increment a third step of 30 degrees, actuating control valve No. 9, thereby retracting the shaft of the right rear ribbon clamp 734b and clamping the ribbon.

The final clamping operation is initiated by depressing the left front clamp switch 726d which rotates the cam shaft for the fourth step of 30 degrees. Approximately halfway through the fourth step, as with the preceding three steps, cam No. 2 actuates the control valve No. 2 which retracts the left front ribbon clamp cylinder 734d to clamp the ribbon. Near the end of the fourth step, cam No. 6 actuates control valve No. 6, which pressurizes the normally retracted left arm finger cylinder so as to close the left arm finger on the left arm thumb and thereby grasp the left end of the ribbon near the left front end of the fixture 100.

Step No. 5 of the operating cycle is commenced when the operator actuates the welder apparatus. Actuation of the welder apparatus causes the welder carriage with attached horn to lower onto the welding fixture until the welder horn contacts the crossed ribbon ends on the welding anvil. The downward vertical motion of the welder carriage causes momentary actuation of the welder sensor valve 740, momentarily connecting the pressurized fluid source 714 to the ratchet cylinder 716 and thereby rotating the cam shaft through the fifth step of 30 degrees. Other than the welding operation which is initiated by the operator's actuation of the welder apparatus, no operation occurs during the fifth step of the operating cycle.

Upward vertical motion of the welder carriage, as the welder horn returns to its normally raised position after the welding operation, momentarily actuates the welder sensor valve 740 a second time, causing the cam shaft to rotate through the sixth step of 300 degrees. During rotation of the cam shaft through its sixth step, three separate operations occur. First, approximately halfway through the sixth step, cam No. 7 actuates control valve No. 7, pressurizing the normally retracted right arm finger cylinder 742. The fluid pressure within the finger cylinder 742 causes the finger of the right arm to close on the thumb of the right arm and thereby to grip the left end of the ribbon at the right rear corner of the fixture 100. Second, near the end of the sixth step, cam No. 11 actuates control valve No. 11, pressurizing the cutter mechanism cylinder 606 as to retract the shaft of the cylinder 606 and thereby lower the cutter mechanism onto the welded ribbon ends and sever the ribbon along the weld bead. Finally, also near the end of the sixth step, cam No. 10 actuates control valve No. 10, applying fluid pressure to the oscillating pneumatic timer circuit 718, which initiates the timer circuit.

The oscillating pneumatic timer circuit 718 is an adjustable single-pulse oscillating circuit, such as an ARO Model No. 59866, which provides a series of bursts of pressurized fluid at predetermined equal time intervals. Each time the timer circuit "fires," pressurized fluid is applied through poppet valves 720d,e, and choke valve 722, and the quick exhaust valve 724 to the ratchet drive cylinder 716, whereby the ratchet drive cylinder causes rotation of the cam shaft through a 30-degree step. Hence, the timer circuit 718 sequentially rotates the cam shaft through 30-degree steps, at predetermined intervals, so long as the circuit 718 is pressurized by actuation of control valve No. 10. The oscillating timer circuit 718 is used within the control system 700 to generate the seventh, eighth, ninth, and tenth steps of the cam shaft.

No operation occurs during the seventh 30-degree step of the cam shaft. During the eighth step of the cam shaft, however, four distinct operations take place. First, approximately halfway through the eighth step, cam No. 2 releases control valve No. 2, pressurizing the extend port 736d of th left front clamp valve 734d so as to raise the left front ribbon clamp. Similarly, approximately halfway through step No. 8, cam No. 8 releases control valve No. 8 so as to raise the left rear ribbon clamp. The third operation within the eighth step also occurs approximately halfway through the step when cam No. 9 releases control valve No. 9 so as to raise the right rear ribbon clamp. Finally, near the end of the eighth step, cam No. 11 releases control valve No. 11 so as to pressurize the opposing port of the cutter mechanism cylinder 606 and thereby raise the cutter mechanism away from the guide plate.

The ninth step, which is generated by the oscillating timer circuit 718, includes two operations. First, cam No. 4 actuates control valve No. 4, pressurizing the shift mechanism cylinder 501 so as to extend the shaft thereof and slide the welding anvil out from under the crossed and welded ribbon ends and, in so doing, slide the ironing anvil into its place. In the second operation of the ninth step, performed simultaneously with the first operation, cam No. 5 actuates control valve No. 5, pressurizing the right arm cylinder 744 so as to extend the shaft of the cylinder and thereby rotate the right arm from atop the guide plate to the outward position away from the guide plate. Such rotation removes the two severed waste ends of the ribbon, which are themselves welded together, from the guide plate area of the welding fixture 100.

The tenth 30-degree step of the control system 700 is initiated by the oscillating timer circuit 718 and includes three distinct operations. In the first operation, cam No. 1 actuates control valve No. 1, pressurizing the left arm cylinder 746 so as to extend the shaft of the cylinder 746 and rotate the left arm from a forwardly pointing position to a rearwardly pointing position. Such rotation rotates the welded ribbon to a flat configuration for the subsequent ironing operation. In the second operation of step 10, cam No. 7 releases control valve No. 7, allowing the shaft of the right arm finger cylinder 742 to resume its normally retracted position, thereby opening the right arm finger and dropping the waste ends of the ribbon. In the final operation of step 10, cam No. 10 releases control valve No. 10, closing the path of fluid communication to the oscillating timer circuit 718 and thereby terminating the automatic firing sequence generated by the timer circuit 718.

The eleventh and twelfth steps are generated by the downward and upward vertical motion of the welder carriage during the ironing operation, in the same manner that the fifth and sixth steps were generated during the welding operation. The operator actuates the welder apparatus, causing the welder carriage to move downward and thereby momentarily actuate the welder sensor valve 740 to generate the eleventh rotational step of the cam shaft. No operation other than the ironing operation occurs during the eleventh step.

The upward vertical motion of the welder carriage momentarily actuates the welder sensor valve 740 a second time, rotating the cam shaft through the twelfth and final 30-degree step. Five distinct operations, other than the raising of the welder carriage, occur during the twelfth step. First, cam No. 1 releases control valve No. 1, pressurizing the left arm cylinder 746 so as to return the left arm from the rearwardly projecting position to the forwardly projecting position. Second, cam No. 3 releases control valve No. 3, pressurizing the right front ribbon clamp cylinder 734a so as to raise the right front ribbon clamp and release the ribbon. Third, cam No. 4 releases control valve No. 4, pressurizing the shift mechanism cylinder 510 so as to shift the welding anvil back to center position within the V-shaped track of the guide plate. Fourth, cam No. 5 releases control valve No. 5, pressurizing the right arm cylinder 744 so as to retract the shaft of the cylinder 744 and return the right arm from its outwardly projecting position to its inwardly projecting position atop the guide plate. Finally, cam No. 6 releases control valve No. 6, allowing the shaft of the left arm finger cylinder 738 to return to its normally retracted position and thereby opening the left arm finger.

The source of pressurized fluid 714 includes downstream in serial communication therewith a regulator 748, a filter 750, a lubricator 752, and a pressure gauge 754.

It may be noted from the pneumatic schematic diagram depicted in FIG. 20 that the pneumatic circuit includes a plurality of choke valves 722 at various points along the fluid lines depicted therein. The choke valves 722 are used to preset the volumetric flow rate of fluid through the fluid line at that point, so as to control the rate at which a particular cylinder is pressurized. The diameter of the orifice of each choke valve 722 is selected independently so as to achieve a particular operating speed. Hence, the choke valves 722 show the rate at which an operation occurs to an acceptable operating speed.

While a preferred embodiment of the invention has been shown and described, modifications thereof can be made by one skilled in the art without departing from the spirit of the invention.

What is claimed is:

1. A welding apparatus for adjoining two ribbon ends by means of a narrow angular weld bead, comprising:
   a plate;
   first and second ribbon guide means for positioning a first ribbon end on said plate, said first and second ribbon guide means defining a first ribbon alignment path;
   third and fourth ribbon guide means for positioning a second ribbon end on said plate in criss-cross configuration with respect to said first alignment path, said third and fourth ribbon guide means defining a second ribbon alignment path;
   means on said plate for clamping the two ribbon ends within said guide means, said clamping means including
   a clamp disposed adjacent to each said guide means, and
   a plurality of means for causing said clamp to engage the ribbon end, one said causing means for each said clamp, said causing means being disposed along said first and second alignment paths;
   first anvil means on said plate beneath the crossed ribbon ends, said first anvil means including a substantially horizontal surface extending substantially the length of said first anvil means for use in welding the ribbon ends and a substantially vertical surface defining a scissor-blade edge in combination with said horizontal surface;
   means for welding the crossed ribbon ends; and
   means forming a part of said apparatus and being apart from said welding means for cutting the crossed ribbon ends after the ribbon ends have been adjoined by said welding means, said cutting means including a cutting blade cooperatively engaging the scissor-blade edge on said first anvil means to sever the adjoined ribbon ends along the weld bead without repositioning the adjoined ribbon ends.

2. A welding apparatus according to claim 1, further comprising means supported from said fixture for locking the welded portion of the crossed ribbon ends against said first anvil means.

3. A welding apparatus according to claim 2,
   wherein said locking means comprises a cutter housing pivotally supported from said apparatus on a first pivot axis, said cutter housing being arranged to pivot from an upper position to a lower position to engage the crossed ribbon ends against said first anvil means; and
   wherein said cutting means comprises the cutting blade attached to said cutter housing on a second pivot axis to permit slicing motion along a line defined by engagement of said cutter housing with said first anvil means.

4. A welding apparatus according to claim 3, wherein said clamping means further comprises:
   a flexible pad on each said clamp for engaging the ribbon ends; and
   means for rotating each said clamp to a position above the ribbon end and for moving each said clamp into contact with the ribbon end with substantially vertical motion.

5. A welding apparatus according to claim 4,
   wherein said plate includes a generally V-shaped track slidably supporting said first anvil means; and
   wherein said apparatus further includes means for locking said first anvil means within said track during operation of said cutting means.

6. A welding apparatus according to claim 1, further comprising:
   a first mechanical arm for repositioning a ribbon end on said plate, said first arm being rotatable about an axis generally aligned with the centerline of said track and in a plane generally perpendicular to the plane defined by said plate; and
   means on said first arm for grasping a ribbon end.

7. A welding apparatus according to claim 6, further comprising:
   a second mechanical arm for disposing of severed ribbon ends, said second arm being rotatable about an axis oriented generally perpendicular to the centerline of said track and in a plane generally perpendicular to the plane defined by said plate; and
   means on said second arm for grasping a ribbon end.

8. A welding apparatus according to claim 5, wherein each said guide means comprises:

a pair of spaced, parallel bars defining therebetween one of said alignment paths for a ribbon end on said plate; and means for adjusting the spacing between said bars, said adjusting means simultaneously moving both said bars the same distance and inherently maintaining the same centerline for said alignment path.

9. A welding apparatus according to claim 8, further comprising:

a second anvil means in said track on said plate, said second anvil means including a generally horizontal surface for use in ironing the ribbon ends; and means for shifting said anvil means to replace said first anvil means with said second anvil means beneath the ribbon ends.

* * * * *